US008277349B2

(12) United States Patent
Erhart et al.

(10) Patent No.: US 8,277,349 B2
(45) Date of Patent: Oct. 2, 2012

(54) ACTUATION SYSTEM

(75) Inventors: Timothy A. Erhart, Chanhassen, MN (US); William J. Zerull, Minneapolis, MN (US); Terrence L. Thompson, Minneapolis, MN (US); James H. Sandlin, Shakopee, MN (US)

(73) Assignee: Exlar Corporation, Chanhassen, MN (US)

( * ) Notice: Subject to any disclaimer, the term of this patent is extended or adjusted under 35 U.S.C. 154(b) by 252 days.

(21) Appl. No.: 12/712,967

(22) Filed: Feb. 25, 2010

(65) Prior Publication Data
US 2011/0053723 A1 Mar. 3, 2011

Related U.S. Application Data

(60) Provisional application No. 61/155,793, filed on Feb. 26, 2009, provisional application No. 61/155,418, filed on Feb. 25, 2009.

(51) Int. Cl.
*F16H 3/72* (2006.01)
(52) U.S. Cl. ...................................... 475/2; 475/3; 475/7
(58) Field of Classification Search .................. 475/3, 7, 475/2
See application file for complete search history.

(56) References Cited

U.S. PATENT DOCUMENTS

| 563,258 | A | * | 7/1896 | Connet | 212/323 |
|---|---|---|---|---|---|
| 1,263,125 | A | * | 4/1918 | Sawyer | 475/7 |
| 1,270,028 | A | * | 6/1918 | Henderson | 318/8 |
| 2,300,576 | A | * | 11/1942 | Klein | 318/2 |
| 2,621,542 | A | * | 12/1952 | Rath | 475/4 |
| 2,940,337 | A | * | 6/1960 | Kalb | 475/6 |
| 3,861,221 | A | | 1/1975 | Stanley | |
| 4,261,224 | A | * | 4/1981 | Sulzer | 475/2 |
| 4,346,728 | A | * | 8/1982 | Sulzer | 137/243.6 |
| 4,423,794 | A | * | 1/1984 | Beck | 180/165 |
| 4,616,528 | A | * | 10/1986 | Malinski et al. | 475/4 |
| 4,896,562 | A | * | 1/1990 | Wilkinson et al. | 475/3 |
| 4,994,001 | A | | 2/1991 | Wilkinson | |
| 7,220,205 | B2 | | 5/2007 | Nagai et al. | |
| 2007/0191177 | A1 | | 8/2007 | Nagai et al. | |

(Continued)

FOREIGN PATENT DOCUMENTS
DE        20012242 U1   12/2000
(Continued)

OTHER PUBLICATIONS

International Search Report and Witten Opinion mailed Oct. 13, 2010.

(Continued)

*Primary Examiner* — Sherry Estremsky
(74) *Attorney, Agent, or Firm* — Merchant & Gould P.C.

(57) ABSTRACT

An actuation system includes a prime mover, a mechanical option module, an actuator, and a controller. The prime mover includes a drive shaft. The mechanical option module includes a housing, an input shaft coupled to the drive shaft, an output shaft, and a planetary gear module. The planetary gear module includes a sun gear coupled to the input shaft, a planet carrier coupled to the output shaft, an outer ring, and planet gears meshed with the sun gear and the outer ring. The application-specific module is connected to the housing and configured to selectively influence movement of the outer ring of the planetary gear module. The actuator includes an actuator input shaft coupled to the output shaft of the mechanical option module. The controller controls an operation of at least one of the prime mover, the mechanical option module, and the actuator.

39 Claims, 16 Drawing Sheets

U.S. PATENT DOCUMENTS

2008/0203221 A1  8/2008  Flatt

FOREIGN PATENT DOCUMENTS

| | | |
|---|---|---|
| EP | 0454530 A1 | 10/1991 |
| EP | 1500856 A1 | 1/2005 |
| FR | 1174093 A | 3/1959 |
| FR | 2116921 A5 | 7/1972 |
| GB | 2216980 A | 10/1989 |
| JP | 2004150620 A | 5/2004 |

OTHER PUBLICATIONS

Exlar Corporation, Exlar 2008 Product Catalog, 2008, pp. 78, 95 and 106 (140 total pages).

Exlar Corporation, Spring Return Assembly Extension, 2005, 3 pages.

McGraw Hill, "Marks Standard Handbook for Mechanical Engineers," Tenth Edition, 1996, pp. 11-8 to 11-9 (shown on 1 page).

Supplemental European Search Report for European Application No. 10746837.3, mailed Jul. 2, 2012, 7 pages.

\* cited by examiner

ACTUATION SYSTEM

CROSS-REFERENCE TO RELATED APPLICATIONS

This Application claims priority to U.S. Provisional Application No. 61/155,418 filed on Feb. 25, 2009, titled "UNIVERSAL ACTUATOR," and to U.S. Provisional Application No. 61/155,793 filed on Feb. 26, 2009, titled "UNIVERSAL ACTUATOR," the disclosures of which are hereby incorporated by reference in their entireties.

TECHNICAL FIELD

The present disclosure generally relates to rotational motion or alternatively translating rotational motion to linear motion and systems therefore; more particularly relates to electrically powered motors, gear motors and linear actuators; and more particularly still to an actuation system including a mechanical option module that provides application-specific functionality to a rotary or linear actuator.

BACKGROUND

Rotary and linear actuators are used in a wide variety of applications. A common configuration of a rotary actuator begins with a motion controllable electric motor. A gear reducer is added to the motor to increase torque output and improve system stability. Another common design of an actuator (for linear output motion) includes a motor, such as an electric motor that generates rotational motion at its output shaft. A linear actuator converts that motion into linear motion that is then applied to the system's load. In this example, the output motion (linear) is applied such that the load is moved along the same or similar path as the linear actuator's output shaft.

Sometimes particular applications require additional functionality. In order to provide this functionality, a customized design may be required that is specifically tailored to the application. Such custom designed actuators can be expensive, require considerable design time, and add a significant amount of time to produce. In some cases, there may not be a suitable design that provides the functionality required by the application.

SUMMARY

In general terms, this disclosure is directed to an actuation system including a planetary gear module. In one possible configuration and by non-limiting example, an apparatus selectively influences rotation of an outer ring of the planetary gear module relative to a housing. In some embodiments, the apparatus includes a linear or rotary actuator.

One aspect is an apparatus including a housing, an input shaft, an output shaft, a planetary gear module, and an application-specific module. The input shaft is arranged and configured to receive a rotary input. The planetary gear module includes a sun gear coupled to the input shaft, a planet carrier coupled to the output shaft, an outer ring, and planet gears meshed with the sun gear and the outer ring. The outer ring is moveable relative to the housing. The application-specific module is coupled to the housing and arranged and configured to influence movement of the outer ring relative to the housing.

Another aspect is an actuation system including a prime mover, a mechanical option module, an actuator, and a controller. The prime mover includes a drive shaft. The mechanical option module includes: a housing; an input shaft coupled to the drive shaft; an output shaft; a planetary gear module including a sun gear coupled to the input shaft, a planet carrier coupled to the output shaft, an outer ring, and planet gears meshed with the sun gear and the outer ring; and an application-specific module connected to the housing and configured to selectively influence rotation of the outer ring of the planetary gear module. The actuator includes an actuator input shaft, the actuator input shaft being coupled to the output shaft of the mechanical option module. The controller controls at least one of the prime mover, the mechanical option module, and the actuator.

Yet another aspect is a method of rotating a sun gear of a planetary gear module upon receipt of a rotary input, the planetary gear module including planet gears, a planet carrier, and an outer ring; selectively influencing rotation of the outer ring of the planetary gear module relative to a housing to adjust rotation of an output shaft; and actuating a linear actuator with the output shaft.

DETAILED DESCRIPTION

Figure 1:
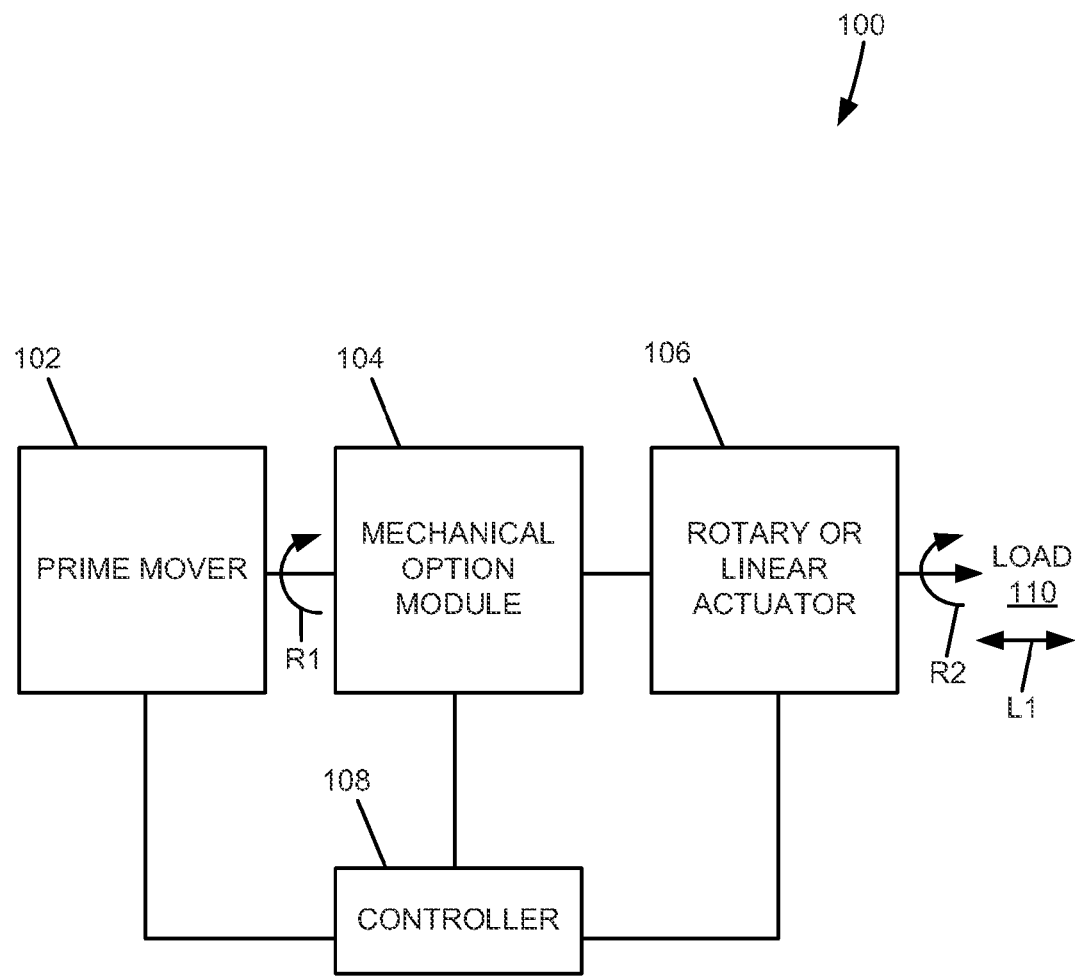
FIG. 1 is a schematic block diagram of an example actuation system according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic block diagram of an example actuation system 100. Actuation system 100 includes prime mover 102, mechanical option module 104, rotational or linear actuator 106, and controller 108. In one example, actuation system 100 operates to generate a rotational motion (R1) using one or more prime movers 102. The rotational motion (R1) through mechanical option module 104 is converted into a linear motion (L1) via linear actuator 106. The linear motion is applied by the linear actuator 106 to a load 110 to move it as desired. In another possible embodiment, actuation system 100 converts the rotational motion (R1) into another rotational motion (R2) through mechanical option module 104 and a rotary actuator 106.

Prime mover 102 is typically an engine or motor that delivers a rotational force to an output shaft. Examples of prime movers 102 include electric motors (including AC and DC motors), a combustion engine, a steam engine, a pneumatic motor, a hydraulic motor, or any other device that generates rotational motion. In some embodiments, two or more prime movers 102 are used. Further, in some embodiments a motion may be applied manually in addition to the motion generated by the prime mover.

Mechanical option module 104 represents the various modules that can be arranged between prime mover 102 and the linear or rotary actuator 106. Various mechanical option modules 104 are available for performing a variety of functions, as described herein, depending on the needs of a particular application. Mechanical option module 104 receives the rotational motion generated by prime mover 102. The motion is then transferred through the mechanical option module 104 and delivered to the linear actuator 106. In some embodiments, mechanical option module 104 operates to transform the motion between prime mover 102 and linear actuator 106. For example, in some embodiments the mechanical option module 104 operates to reduce the speed of rotation but increases the torque. Other embodiments of mechanical option module 104 are used to provide additional features or functionality. The use of a mechanical option module allows the linear actuator to be used in a variety of applications without requiring that a customized actuator be designed and built to perform the necessary functions. This reduces cost and time required for development and delivery.

Figure 2:
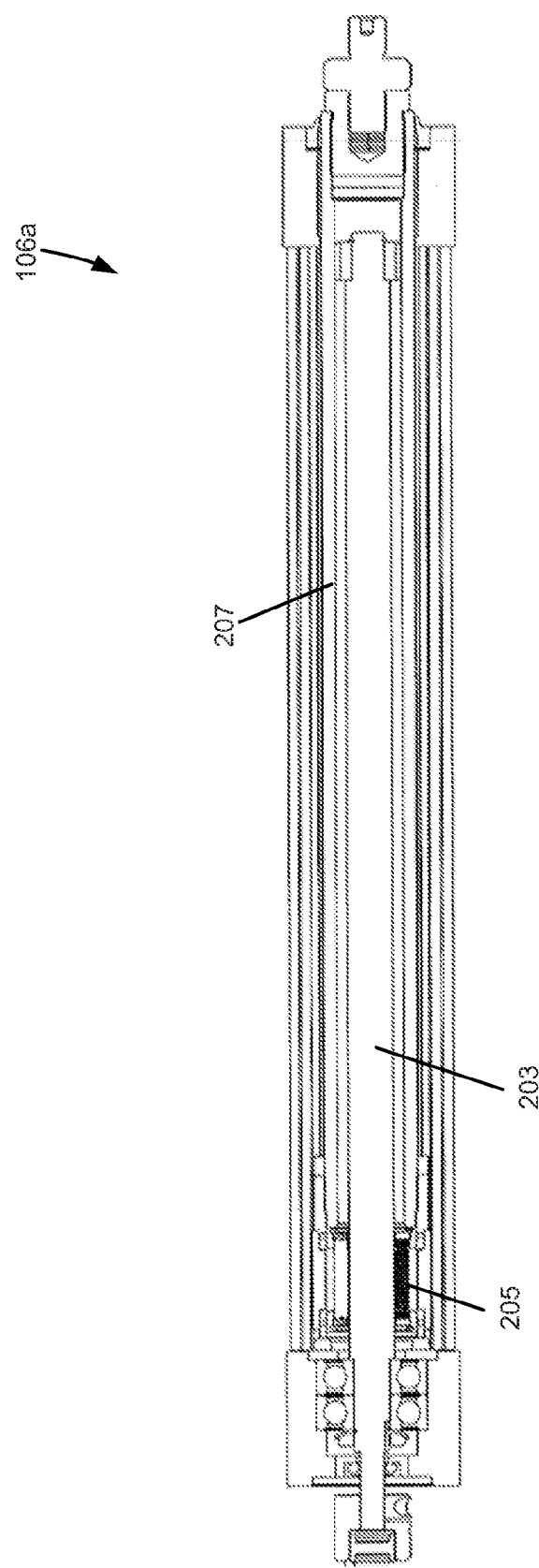
FIG. 2 is a schematic block diagram of an example linear actuator of the actuation system shown in FIG. 1.
Figure 3:
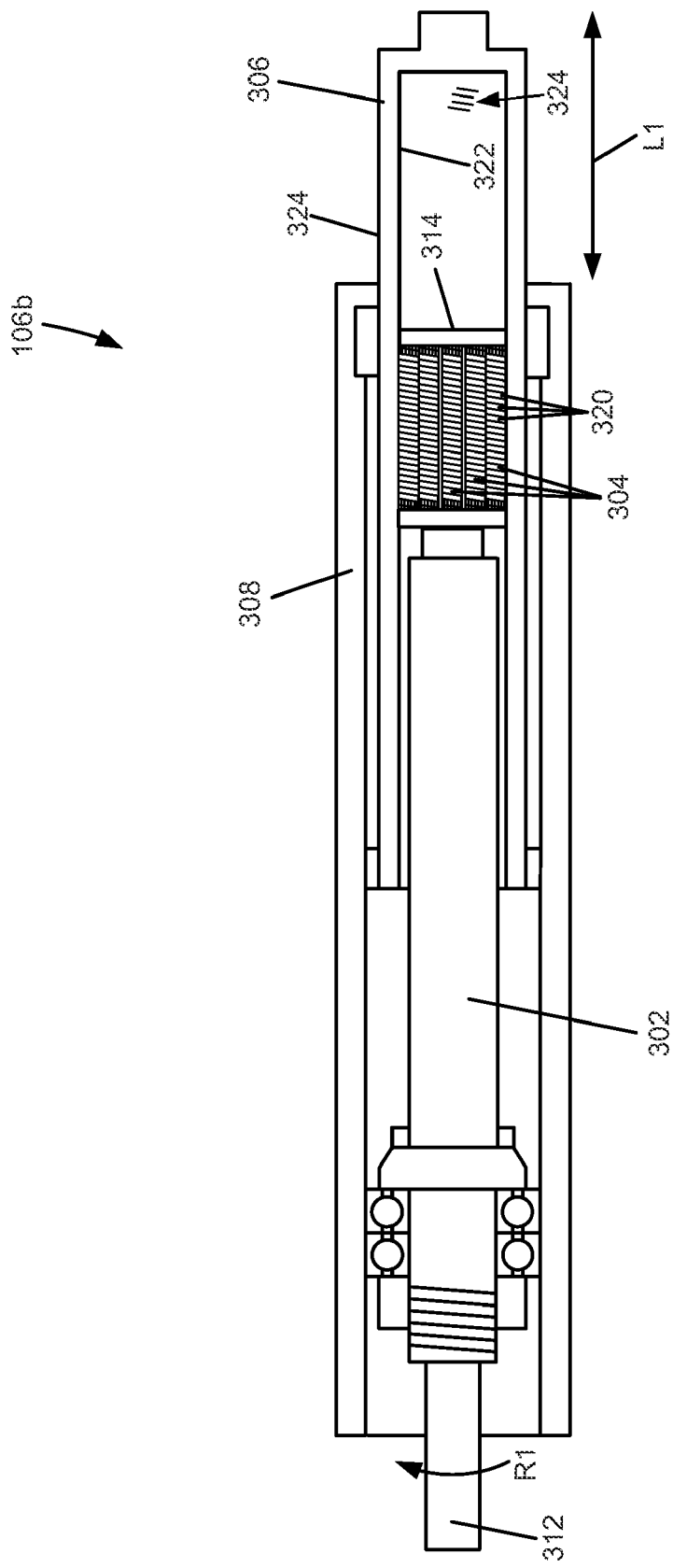
FIG. 3 is a schematic side view of another example linear actuator of the actuation system shown in FIG. 1.

In some embodiments actuation system 100 includes a rotary or linear actuator 106. A linear actuator 106 is a device that converts rotary (input) motion (R1) into linear or axial motion (L1). Examples of linear actuators 106 are shown in FIGS. 2-3. Other embodiments include rotary actuators, such as a rotary actuator that converts rotary motion (R1) into a different rotary motion (R2). In some embodiments the mechanical option module 104 is coupled to the rotary output of the prime mover 102 and the rotary input of the rotary or linear actuator 106. Another example of a linear actuator 106 (106b) is an inverted roller screw actuator, such as illustrated in FIG. 3.

Controller 108 controls the operation of actuation system 100. In some embodiments, controller 108 is a computer. In other embodiments, controller 108 includes a processing device, memory, and interface components (such as input/output ports or other communication ports). Examples of processing devices include a microprocessor, a central processing unit, a microcontroller, a programmable logic device, a field programmable gate array, and a digital signal processing device. Other processing devices are used in other embodiments. Processing devices can be of any general variety such as a reduced instruction set computing (RISC) device, a complex instruction set computing device (CISC), a minimal instruction set computing device (MISC), or a specially designed processing device such as an application-specific integrated circuit (ASIC) device. Controller 108 is operable to control the operation of any one of prime mover 102, mechanical option module 104, and rotary or linear actuator 106. In addition, in some embodiments controller 108 receives feedback from load 110 (such as from sensors or other communication devices not shown). Such feedback can be used by controller 108 to adjust the operation of actuation system 100 accordingly. In some embodiments, controller 108 is a single device, while in other embodiments controller includes more than one device. Controller 108 is configured to interact with any one or more of prime mover 102, mechanical option module 104, and rotary or linear actuator 106 in the various possible embodiments. In some embodiments controller 108 is integrated with one or more of prime mover 102, mechanical option module 104, and rotary or linear actuator 106. In another possible embodiment, controller 108 is a switch. Some embodiments do not include controller 108.

Some embodiments of controller 108 include computer readable storage media. Examples of computer readable storage media include a hard disk drive, a magnetic cassette, a flash memory card, a digital video disk, a Bernoulli cartridge, a compact disc read only memory, a digital versatile disk read only memory, random access memory, read only memory, or other memory devices. In some embodiments, computer readable storage media stores data instructions that, when executed by a processing device, cause the processing device to perform one or more of the methods, operations, or functions described herein. In some embodiments, computer readable storage media includes computer non-transitory media. Yet other embodiments include computer readable media, which may include forms of transitory and/or communication media.

As illustrated in FIG. 1, some embodiments of actuation system 100 are designed based on the principle of modularity. In other words, in some embodiments certain components or modules of actuation system 100 are interchangeable with other components or modules. For example, in some embodiments the mechanical option module 104 is interchangeable with other mechanical option modules that provide different features or functionality. In some embodiments the modularity of the actuation system 100 provides for efficient manufacturing and assembly of products to meet the particular needs of a specific application.

In some embodiments, components or modules of actuation system 100 are designed for different levels of force or torque different levels of travel life at a specified torque or force (e.g., several grades of performance). Typically, components or modules that are designed for lower performance can be manufactured more inexpensively than those with higher performance requirements. As a result, providing components or modules designed for various grades of performance allows the least expensive module to be selected that will meet the requirements of a specific application.

FIG. 2 is a schematic block diagram of an example linear actuator 106a. In this example, linear actuator 106a includes a housing 201, screw mechanism 203, follower 205, and tube mechanism 207.

In some embodiments, linear actuator 106a is a screw type actuator utilizing a screw mechanism 203 (such as a ball screw, acme screw, or roller screw) mounted inside of housing 201. A periscoping tube mechanism 207 provides the output force. One embodiment including one or more transmission devices, a follower 205 is attached to the moveable tube mechanism 207 inside the actuator housing 201 thereby extending the tube mechanism 207 as the shaft of the screw mechanism 203 rotates. The tube mechanism 207 is typically supported and guided by a bearing at the front end of the actuator housing.

Additional examples of linear actuators are described in U.S. Pat. No. 5,491,372, titled "Electric Linear Actuator With Planetary Action," and in U.S. Pat. No. 5,557,154, titled, "Linear Actuator With Feedback Position Sensor Device."

FIG. 3 is a schematic side view of another example linear actuator 106b, with portions of linear actuator 106b being removed to show internal components. Linear actuator 106b includes input shaft 302, transmission rollers 304, output rod 306, and housing 308. When a rotational force (R1) is provided to input shaft 302, output rod 306 is moved forward or backward between extended and retracted positions in the directions L1.

Input shaft 302 is typically a single elongated and generally cylindrical shaft. Input shaft 302 includes a first end 312 and a second end 314. First end 312 is configured to receive a rotational force, such as from mechanical option module 104 (shown in FIG. 1). In some embodiments a shaft coupler (not shown) connects mechanical option module 104 to first end 312. The rotational force is transferred through input shaft 302 to second end 314. Second end 314 of input shaft 302 is coupled to a transmission device, such as transmission rollers 304, such that as the input shaft 302 rotates, transmission rollers revolve around second end 314 of input shaft 302.

Transmission rollers 304 include a plurality of individual rollers spaced around and coupled to the second end 314 of input shaft 302. Rollers 304 include raised ribs 320 arranged in a generally helical pattern that extend along the outer surface of rollers 304. Ribs 320 engage both the threaded second end 314 of input shaft 302 and a threaded interior surface of output rod 306.

Output rod 306 typically includes an at least partially hollow cylinder having an inner surface 322 and an outer surface 324. In some embodiments inner surface 322 is threaded with helical ribs, illustrated schematically at 324. The threaded helical ribs of inner surface 322 engage with ribs 320 of transmission rollers 304. When transmission rollers 304 are caused to rotate by input shaft 302, ribs 320 of transmission rollers 304 engage with ribs or threaded inner surface 322 causing translation of output rod 306 in the forward of backward direction L1.

Examples of linear actuator 106b and other linear actuators are described in more detail in U.S. Publication No. 2007/0137329 (U.S. Ser. No. 11/259,175), titled "Method and Apparatus for an Inverted Roller Screw."

Figure 4:
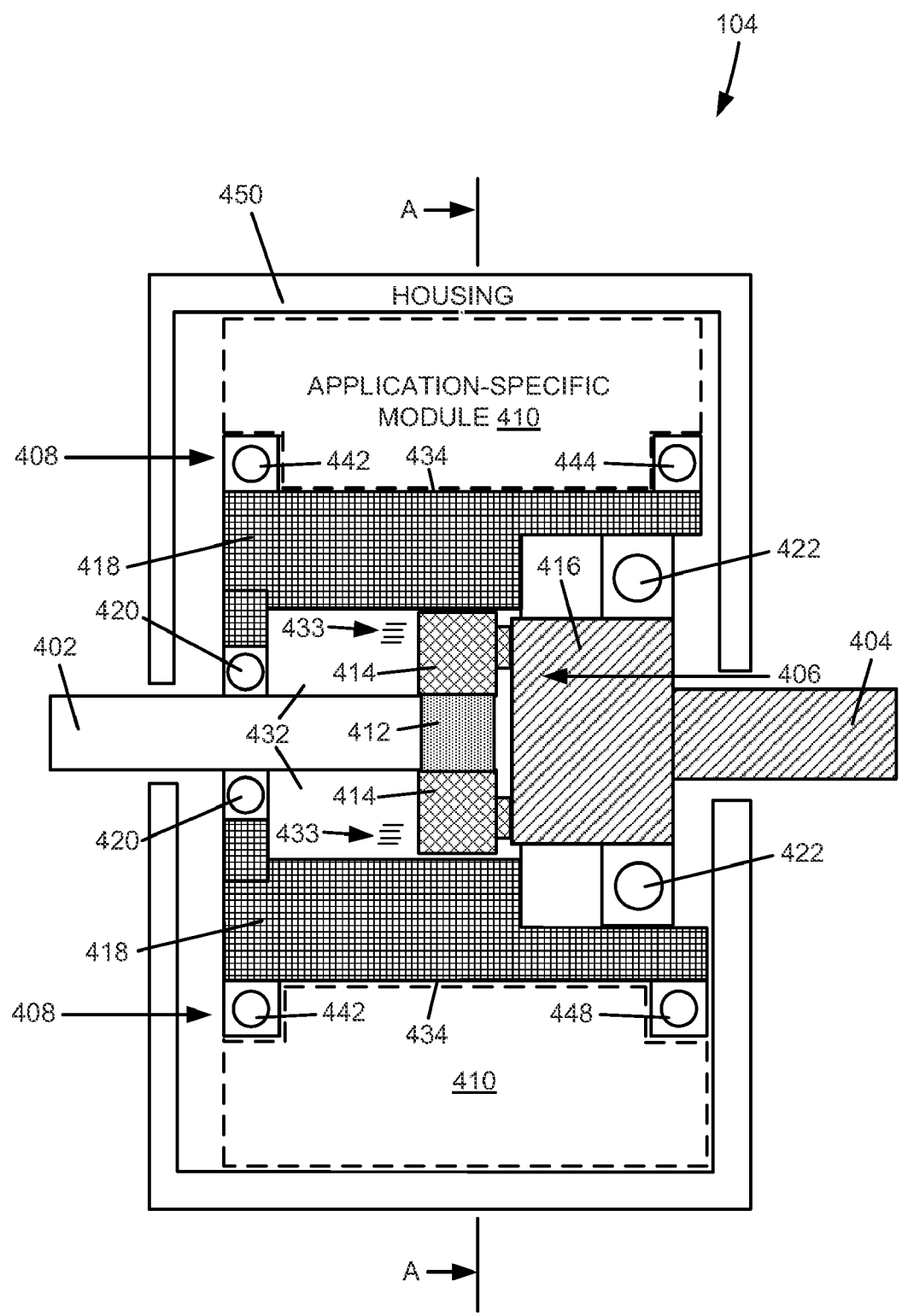
FIG. 4 is a schematic block diagram and cross-sectional view of an example mechanical option module of the actuation system shown in FIG. 1.

Mechanical option module 104 will now be described in more detail below with reference to FIGS. 4-16. A block diagram illustrating a first exemplary configuration of a mechanical option module 104 is shown in FIG. 4, followed by a variety of additional examples shown in FIGS. 5-13, all of which utilize the first configuration of the mechanical option module 104 or variations thereof. A block diagram illustrating a second exemplary configuration of a mechanical option module 104 is shown in FIG. 14, followed by a variety of additional examples shown in FIGS. 15-16 that utilize the second exemplary configuration of the mechanical option module 104.

Figure 5:
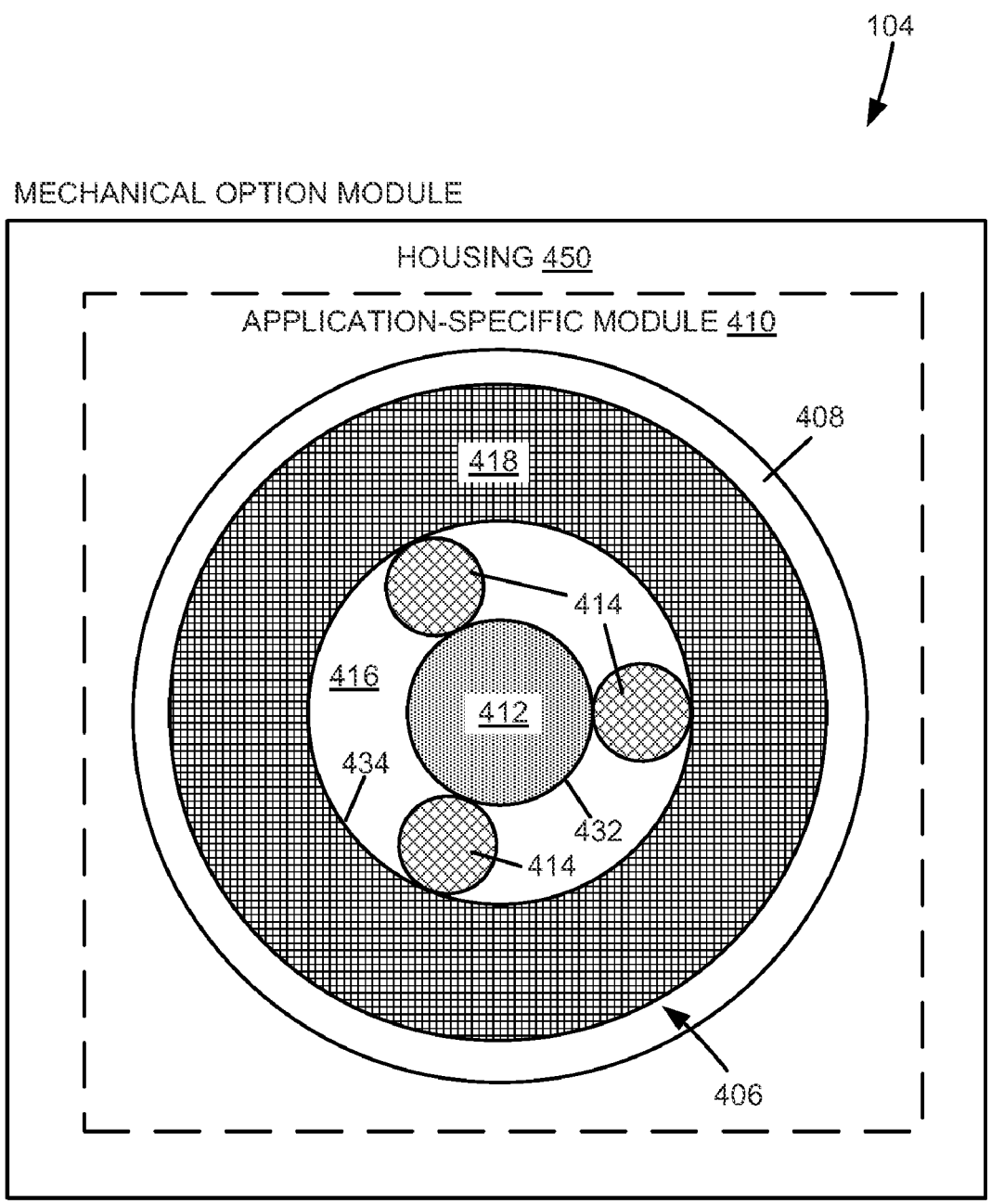
FIG. 5 is another schematic block diagram and cross-sectional view of the example mechanical option module shown in FIG. 4.

FIGS. 4 and 5 illustrate an example of mechanical option module 104. FIG. 4 is a schematic block diagram and cross-sectional view of an example mechanical option module 104. FIG. 5 is another schematic block and cross-sectional view of the example mechanical option module 104. The cross-section shown in FIG. 5 is through line A-A, illustrated in FIG. 4. In some embodiments, mechanical option module 104 includes input shaft 402, output shaft 404, planetary gear module 406, bearing assembly 408, an application-specific module 410, and housing 450. Mechanical option module 104 includes one of a variety of selectable application-specific modules 410 that can be selected to provide various features and functionality appropriate for a particular application. Regardless of the application-specific module selected, mechanical option module 104 is configured to be coupled to linear or rotary actuator 106 without requiring modification to the actuator 106.

Mechanical option module 104 receives a rotational input at input shaft 402. In some embodiments a shaft coupler is used to connect input shaft 402 to another device (e.g., to an output shaft of prime mover 102). Mechanical option module 104 also includes an output shaft 404 where a rotational output is provided to another device (e.g., to an input shaft of linear actuator 106).

Planetary gear module 406 is included in some embodiments of mechanical option module 104. Planetary gear module 406 typically includes a sun gear 412, planet gears 414, planet carrier 416, and outer ring 418. Bearings 420 and 422 are also included in some embodiments. Planetary gear module 406 is rotatably supported by bearings 442 and 444 and is coupled to housing 450 only through application-specific module 410 in some embodiments.

In this example, sun gear 412 is formed at an end of input shaft 402. Sun gear 412 is typically a cylindrical gear including a plurality of radially extending teeth. As input shaft 402 is caused to rotate (e.g., by prime mover 102), the teeth of sun gear 412 also rotate. Sun gear 412 is sized to fit between planet gears 414.

A plurality of planet gears 414 are arranged around sun gear 412. Planet gears 414 are typically cylindrical gears including a plurality of radially extending teeth. Another embodiment includes a helical tooth pattern. Teeth of planet gears are sized and arranged to mate with teeth of sun gear 412 as well as an inner surface of outer ring 418. In some embodiments planet gears 414 have a smaller diameter than sun gear 412. In some embodiments planetary gear module includes at least three planet gears 414. Additional planet gears 414 can be included in other embodiments up to the maximum number that can physically fit within the space available between the sun gear 412 and outer ring 418. Normally three gears will be adequate. Other embodiments include other quantities of planet gears 414. Planet gears are preferably confined to a space between sun gear 412 and outer ring 418.

When sun gear 412 rotates, teeth of sun gear 412 transfer a torque into planet gears 414. This force causes planet gears to rotate and also to revolve around sun gear 412. When outer ring 418 is held stationary, the rate of revolution of planet gears 414 is a function of the rotational speed of sun gear and also a function of the relative circumferences of sun gear 412 and planet gears 414 (or, stated another way, a function of the number of teeth of sun gear 412 relative to planet gears 414).

Planet gears 414 are coupled at an end to planet carrier 416. Planet gears 414 are free to rotate relative to planet carrier 416. As planet gears 414 revolve around sun gear 412, force is transferred into planet carrier 416 causing planet carrier 416 to rotate. As a result, the rate of revolution of planet gears 414 is equal to the rate of rotation of planet carrier 416. Planet carrier 416 is coupled or rigidly connected to output shaft 404.

Planetary gear module 406 provides an overall gear reduction from input shaft 402 to output shaft 404. The gear reduction of one stage is typically in a range from about three to about 10. Other embodiments include cascading stages by connecting the output of one stage to the input of the next stage. Cascading stages are used to multiply these ratios accordingly (i.e. providing a gear reduction in a range from about nine to about 100 with two stages). In some embodiments that utilize multiple stage reduction, one common outer ring 418 can be used having adequate length to accommodate multiple stages of gear reduction with additional sun gears 412, planet gears 414, planet carriers 416, and output shafts 404. When the outer ring 418 is fixed, the gear reduction causes the speed of rotation of the input shaft to be greater than the resulting speed of rotation of the output shaft. On the other hand, the torque on the output shaft is greater than the torque at the input shaft by the gear reduction ratio.

Outer ring 418 is the outer portion of planetary gear module 406. In some embodiments, outer ring 418 includes an inner surface 432 and an outer surface 434. Inner surface 432 is typically a cylindrical bore and includes a plurality of teeth (schematically illustrated in FIG. 4 at 433). Inner surface 432 engages and meshes with planet gears 414 as they revolve around sun gear 412. In some embodiments outer surface 434 also includes a cylindrical bore and may include a plurality of teeth along at least a portion of outer surface 434. In some embodiments outer surface 434 is cylindrical, but in other embodiments outer surface 434 includes a non-cylindrical shape (such as including a radially extending gear portion).

Bearings 420 and 422 are provided in some embodiments to separate moving components from each other with low friction, while providing support to components of the planetary gear module 406. In one embodiment, bearings 420 and 422 are circular ball bearings. Other example of bearings include needle bearings, bushings (e.g., bushings of bronze, sintered metals, plastics, or other materials, such as those used in sleeve type bushings), and fluid bearings. Bearing 420 supports input shaft 402 and locates sun gear 412 in the center of planet gears 414 relative to outer ring 418. Bearing 422 separates planet carrier 416 from outer ring 418. Bearing 420 supports input shaft 402 and bearing 422 supports output shaft 404, providing added strength and stability.

Mechanical option module 104 also includes bearing assembly 408. In this example, bearing assembly 408 includes bearings 442 and 444. Bearing assembly 408 is connected at one edge to outer surface 434 of outer ring 418 and at another edge to a portion of application-specific module 410. Bearing assembly 408 operates to allow outer ring 418 of planetary gear module 406 to rotate independent of (or not as determined by) application-specific module 410. Bearing assembly 408 is just one example of a variety of possible embodiments that can utilize different bearing assemblies or different supporting structures other than bearings. Other embodiments utilize other structures that permit outer ring 418 to rotate independent of housing 450.

Application-specific module 410 is one of a variety of possible modules that is selected to provide one or more features (and/or to perform one or more functions) that are desired for a particular application. Application-specific module 410 is connected to housing 450. Application-specific module 410 is also arranged and configured to connect with bearing assembly 408 and to interface with outer surface 434. Examples of application-specific modules 410 are described in more detail with reference to FIGS. 6-12 below.

Figure 6:
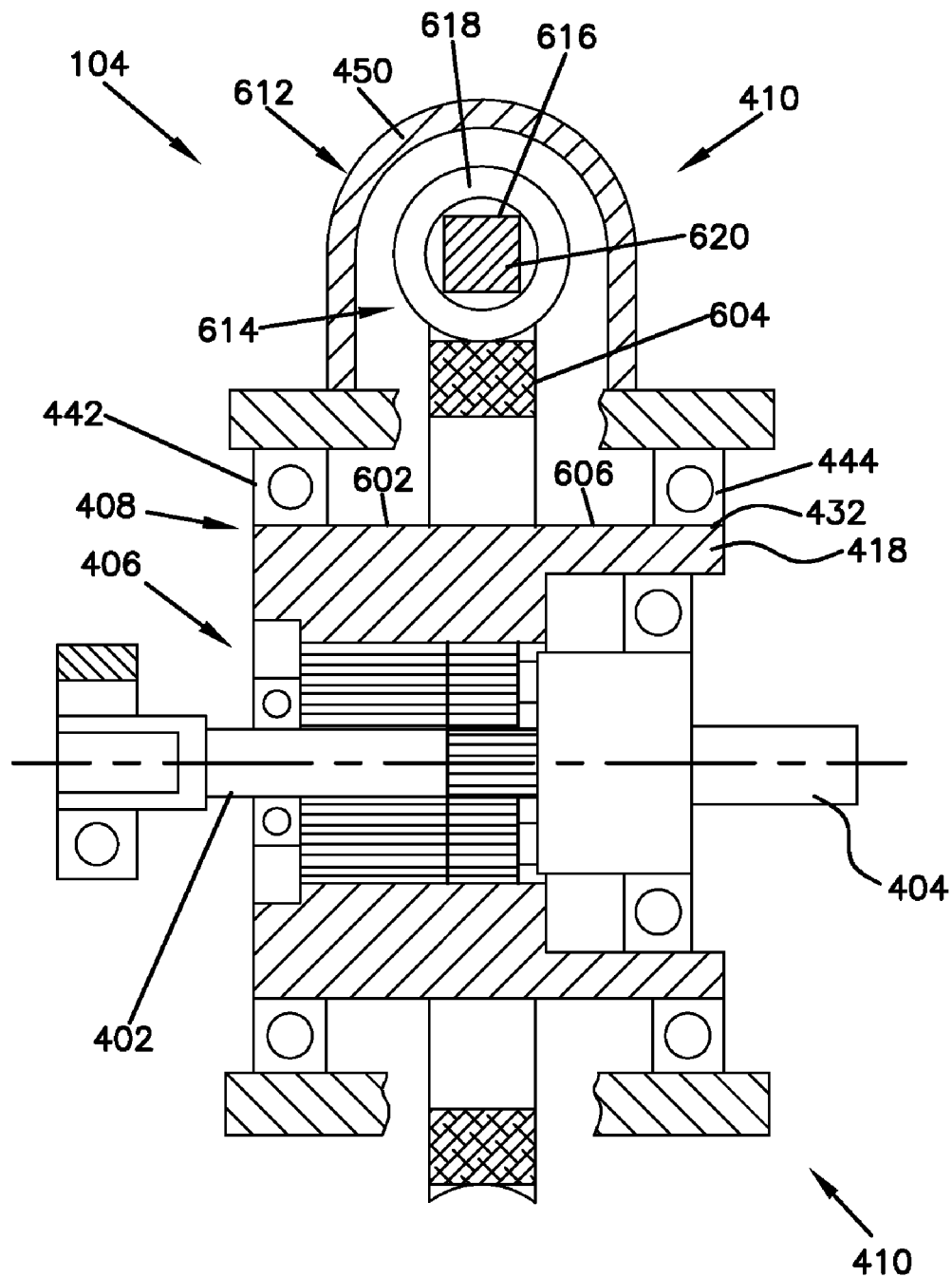
FIG. 6 is a schematic cross-sectional view of an example mechanical option module.
Figure 7:
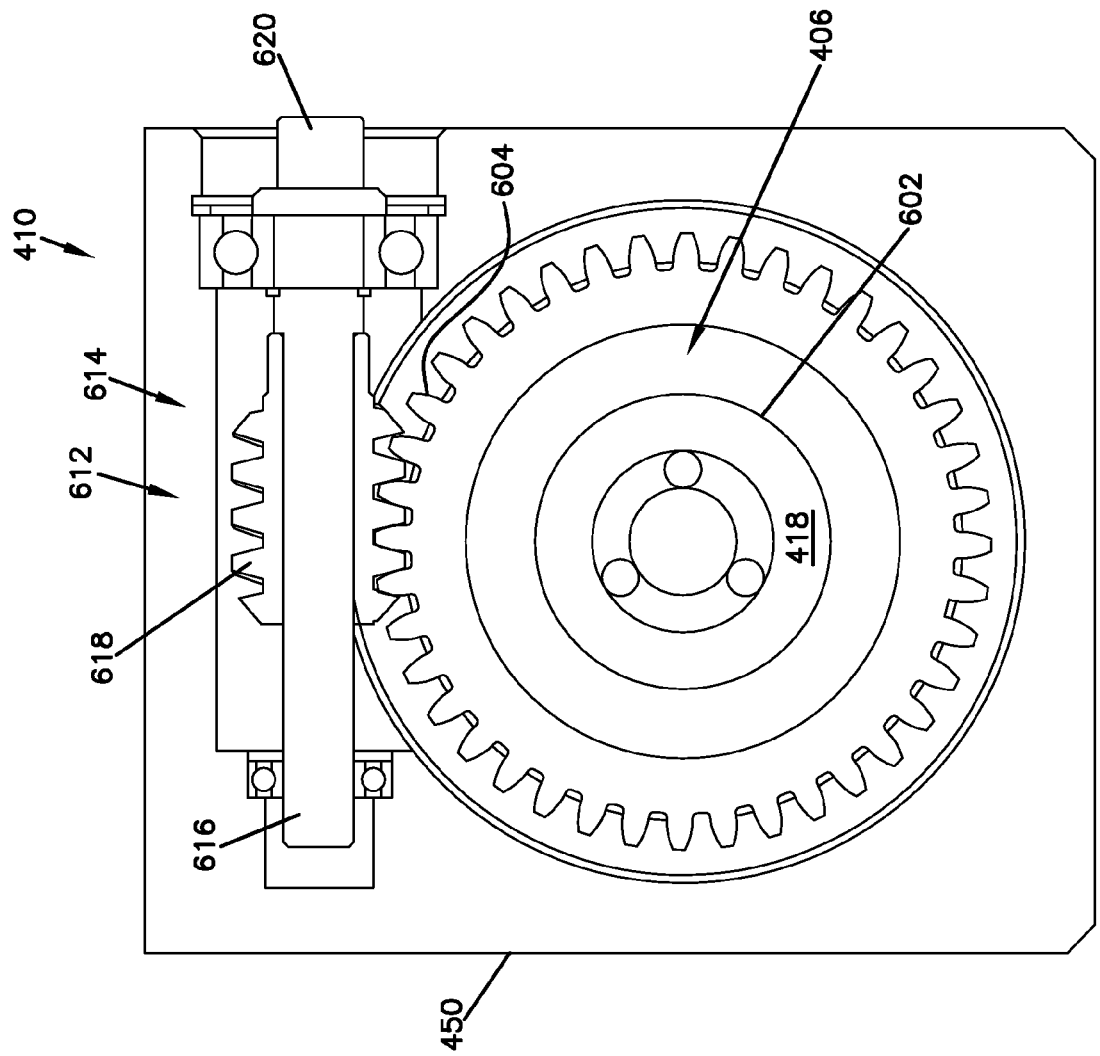
FIG. 7 is another schematic cross-sectional view of the example mechanical option module shown in FIG. 6.

FIGS. 6 and 7 illustrate an example of a first embodiment of a mechanical option module 104. FIG. 6 is a schematic cross-sectional view of the first embodiment of the mechanical option module 104. FIG. 7 is another schematic cross-sectional view of the first embodiment of the mechanical option module 104. In this embodiment, application-specific module 410 includes a manual drive feature. The manual drive feature is useful, for example, as a backup in the event that power is lost. In this event, the manual drive can be used to manually operate the actuation system.

Mechanical option module 104 includes input shaft 402, output shaft 404, planetary gear module 406, bearing assembly 408 (including bearings 420 and 422), application-specific module 410, and housing 450. Planetary gear module 406 includes an outer ring 418 having an outer surface 434.

In some embodiments, outer ring 418 has an outer surface 434 having first region 602, a second region 604 (also referred to herein as a protruding gear region), and a third region 606. First and third regions 602 and 606 are generally parallel with each other around a circumference of outer ring 418. In some embodiments first and third regions 602 and 606 are substantially smooth. Second region 604 protrudes radially from first and third regions 602 and 606, and preferably includes a plurality of radially extending teeth. In some embodiments protruding gear region 604 includes a helical gear pattern. This protruding gear region 604 is not included in all embodiments.

In this embodiment, application-specific module 410 includes a manual drive assembly 612 that prevents outer ring 418 from rotating due to input torque at input shaft 402. One example of a manual drive assembly 612 is a worm screw 614. Worm screw 614 preferably includes a shaft 616, a helical protrusion 618, and a manual input port 620. Additional support members are included in some embodiments to support worm screw 614, such as to connect and support manual drive assembly to housing 450.

Input port 620 is arranged at an end of shaft 616 and is arranged and configured to receive an input, such as a manual input at input port 620. In one example, input port 620 has a hex cross-section and is sized to be engaged by a socket wrench. Other embodiments include other configurations, such as having a square or slotted head. Another possible embodiment includes a knob or handle sized and configured to be grasped and rotated or otherwise moved by a human hand. An input supplied to input port 620 causes shaft 616 to rotate.

When shaft 616 rotates, the helical protrusion 618 also rotates. Helical protrusion is arranged to mate with teeth of protruding gear region 604. The rotation of helical protrusion 618 causes rotation of outer ring 418 of planetary gear module 406. The rotation of outer ring 418 can be reversed by rotating shaft 616 in an opposite direction. The manual input is transferred through planetary gear module 406 and to output shaft 404, so as to operate the actuator (e.g., rotary or linear actuator 106, shown in FIG. 1 and sometimes referred to hereafter as actuator 106 for convenience).

During normal operation, a manual input is not provided to input port 620. In some embodiments, manual drive assembly 612 operates as a brake when not providing an input to prevent outer ring 418 of planetary gear module 406 from rotating relative to application-specific module 410 and housing 450. Any force applied to outer ring 418 (such as from prime mover 102, shown in FIG. 1) is hindered by the presence of the stationary helical protrusion 618. If necessary, a lock or brake is included in some embodiments to prevent unintentional rotation of manual drive assembly 612.

During manual operation, an input is supplied to input port 620. In order to prevent input shaft 402 from rotating during the manual operation, prime mover 102 includes a brake in some embodiments or a separate brake is included in mechanical option module 104 to prevent or inhibit rotation of input shaft 402.

Figure 8:
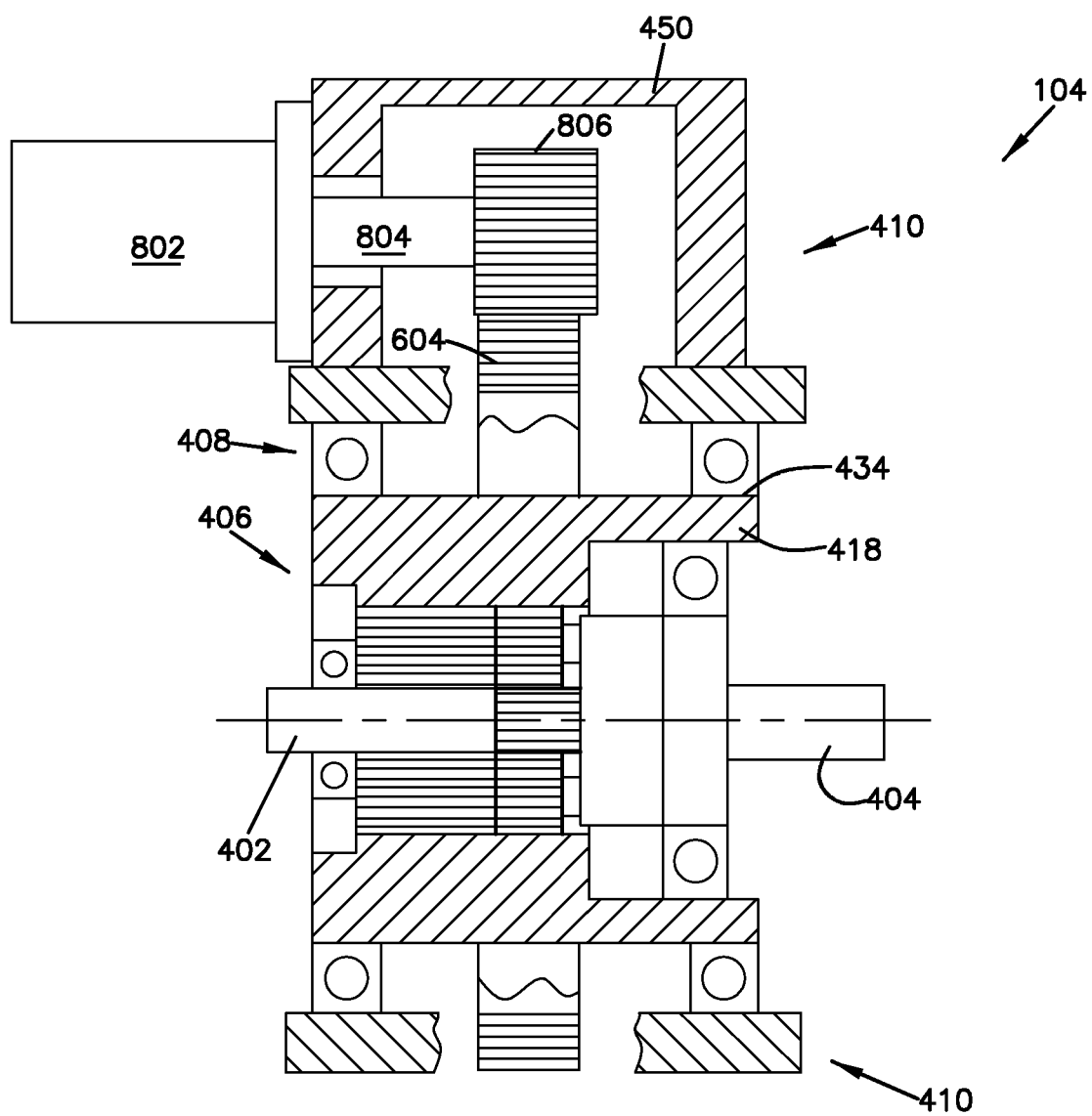
FIG. 8 is a schematic cross-sectional view of another example mechanical option module.

FIG. 8 is a schematic cross-sectional view of a second embodiment of a mechanical option module 104. Mechanical option module 104 includes input shaft 402, output shaft 404, planetary gear module 406, bearing assembly 408 (including bearings 420 and 422), application-specific module 410, and housing 450. Planetary gear module 406 includes an outer ring 418 having an outer surface 434. In this embodiment, application-specific module 410 allows mechanical option module 104 to include a second drive unit, such as a secondary motor.

In some embodiments, outer ring 418 includes protruding gear section 604 (as discussed in more detail herein with respect to FIGS. 6 and 7) having a plurality of radially extending teeth. Protruding gear section 604 is a spur gear in some embodiments.

In this embodiment, application-specific module 410 is arranged and configured to receive power from a secondary motor 802. The secondary motor includes an output shaft 804 (alternatively, output shaft 804 is coupled to the rotor of motor 802, such as using a shaft coupler). A gear 806 is connected to output shaft 804 so as to rotate at the same rate as output shaft 804. Gear 806 is arranged so as to mesh with teeth of protruding gear region 604 of outer ring 418, to transfer rotational power into outer ring 418 when power is supplied by secondary motor 802. Power transferred to outer ring 418 passes through planetary gear module 406 and is output at output shaft 404.

An example of secondary motor 802 is a servo motor, but other embodiments include other drive units. Secondary motor 802 preferably includes an integrated brake to prevent gear 806 from unintentional rotation. When secondary motor 802 is not supplying power to gear 806, the brake is engaged. The brake is disengaged when secondary motor 802 is supplying power to gear 806.

In this embodiment, mechanical option module 104 allows two motors (or other drive units) to be used to control the operation of the planetary gear module, and accordingly the operation of the actuator via the resulting motion at output shaft 404 (e.g., actuator 106, shown in FIG. 1). In some embodiments, for example, the prime mover (e.g., prime mover 102, shown in FIG. 1) is a high speed motor with relatively low torque, while the secondary motor 802 is a low speed motor with relatively high torque. The opposite arrangement is used in other embodiments.

In yet other embodiments prime mover 102 and secondary motor 802 are the same or similar drive units. For example, in some embodiments secondary motor 802 is a redundant motor configured to be activated when controller 108 detects a failure of the prime mover.

Prime mover 102 and secondary motor 802 can be operated at the same time, or can be operated individually or selectively.

Although this example of a second embodiments of mechanical option module 104 transfers power between secondary motor 802 and outer ring 418 through the use of spur gears, other embodiments include other power transfer mechanisms. For example, some embodiments include a belt or chain to transfer power from secondary motor 802 to outer ring 418.

Figure 9:
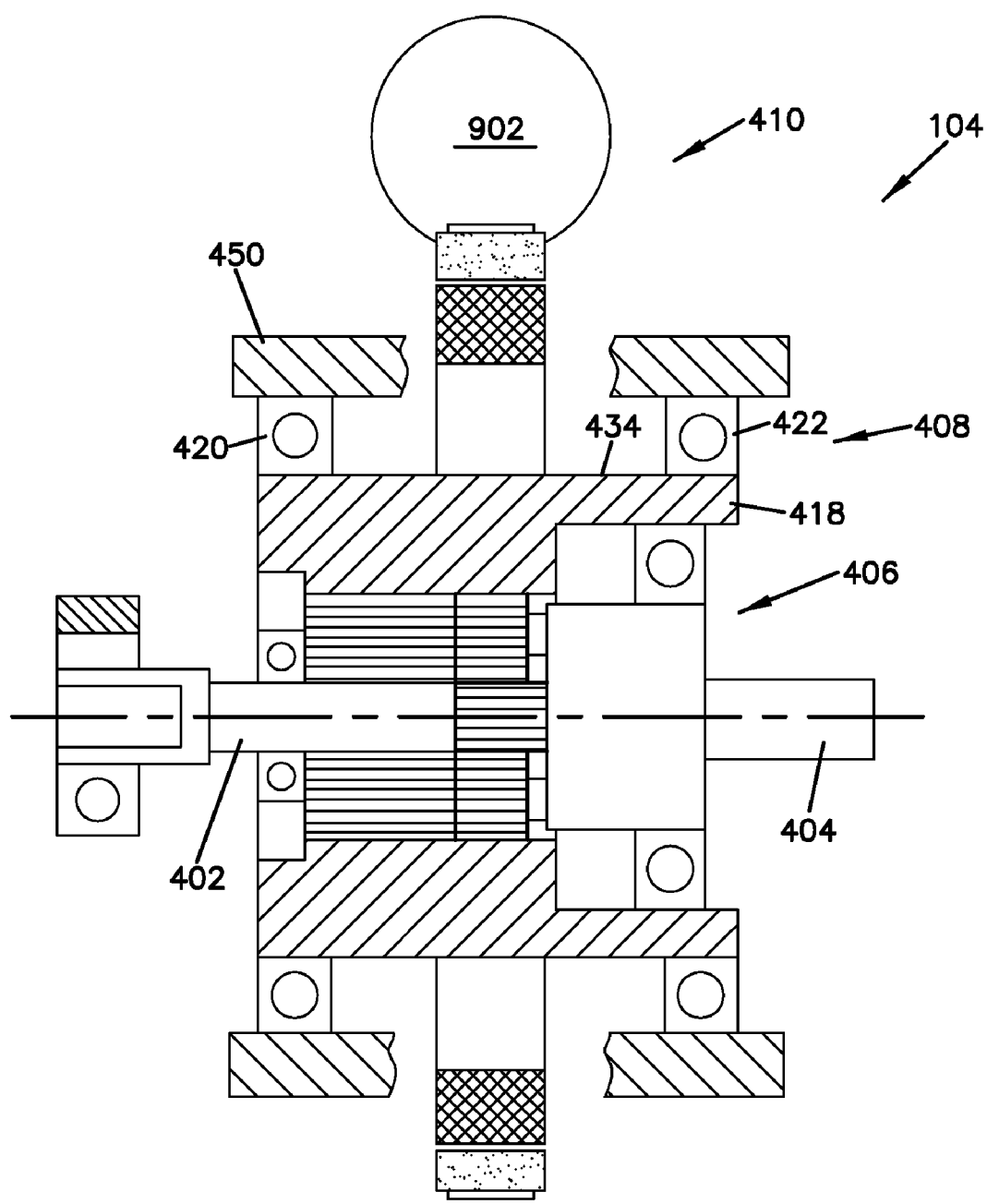
FIG. 9 is a schematic cross-sectional view of another example mechanical option module.

FIG. 9 is a schematic cross-sectional view of a third embodiment of a mechanical option module 104. Mechanical option module 104 includes input shaft 402, output shaft 404, planetary gear module 406, bearing assembly 408 (including bearings 420 and 422), and application-specific module 410. Planetary gear module 406 includes an outer ring 418 having an outer surface 434 (including a protruding gear region 604). In this embodiment, application-specific module 410 allows mechanical option module 104 to selectively disengage the actuator 106. In this way, the linear actuator becomes freely (or substantially freely) movable, such as during an emergency or power failure situation.

In this embodiment, application-specific module 410 includes holding brake 902. Holding brake 902 is arranged and configured to apply a braking force to protruding gear region 604. In one example, during normal operation the holding brake 902 operates to prevent outer ring 418 from rotating by applying a braking force to protruding gear region 604. The holding brake 902 can also be disengaged, so as to release the braking force. When disengaged, holding brake 902 allows outer ring 418 to freely rotate. As a result, output shaft 404 is free to rotate independent of input shaft 402. In some embodiments when the output shaft 404 is freely rotatable the mechanical option module is referred to as having a floating output rod.

This embodiment is useful in many applications. For example, in one embodiment an actuation system (e.g., 100, shown in FIG. 1, including a prime mover 102, mechanical option module 104, and actuator 106) is part of a power steering system, such as to move a rudder of a ship. In the event that power is lost to the prime mover 102, it is desirable to continue operating the rudder manually so that the ship can be steered. When power is lost, holding brake 902 is released (either automatically upon the loss of power, or manually) to allow the rudder to be manually steered without the assistance of the prime mover. Because outer ring 418 is free to rotate, the mechanical option module does not oppose, or substantially oppose, rotation at output shaft 404. Thus, actuator 106 is also free to move with the movement of the rudder. In some embodiments an actuator 106 is used that is highly efficient, such as having a high lead.

In another possible embodiment, holding brake 902 is normally disengaged, allowing outer ring 418 to freely rotate. Upon the occurrence of an event, such as a loss of power, holding brake 902 is automatically engaged, thereby preventing (or reducing) rotation of outer ring 418.

These examples are provided to illustrate only several possible applications of the third embodiment of the mechanical option module. Other embodiments are used in a variety of other applications.

Figure 10:
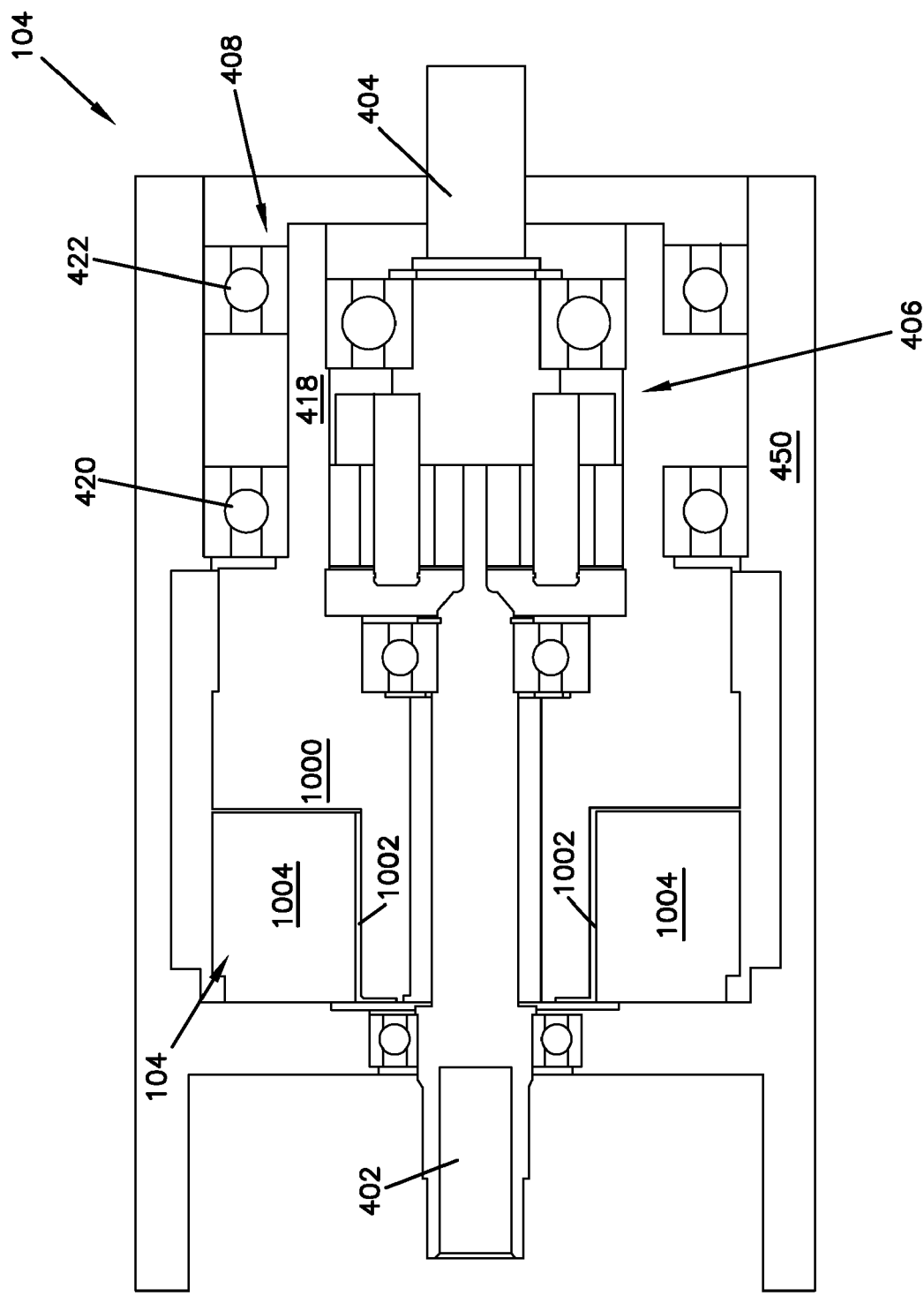
FIG. 10 is a schematic cross-sectional view of an alternative embodiment of the mechanical option module shown in FIG. 9.

FIG. 10 is a schematic cross-sectional view of an alternative embodiment of the mechanical option module shown in FIG. 9. In this example, mechanical option module 104 includes input shaft 402, output shaft 404, planetary gear module 406, bearing assembly 408 (including bearings 420 and 422), and application-specific module 410. Planetary gear module 406 includes an outer ring 418 having an extended brake portion 1000. The extended brake portion includes braking surface 1002. Application-specific module 410 also includes holding brake 1004.

In this example, outer ring 418 does not include a protruding brake portion. Rather, outer ring 418 includes an extended brake portion 1000 rigidly connected thereto. Brake 1004 is arranged around a braking surface 1002 of extended brake portion 1000. When brake 1000 is engaged, a holding force is applied to braking surface 1002 to prevent or reduce rotation of outer ring 418 with respect to housing 450. When brake 1000 is not engaged, extended braking portion 1000 and outer ring 418 are free to rotate relative to housing 450 due to torques that may be applied to input or output shafts 402 and 404.

Figure 11:
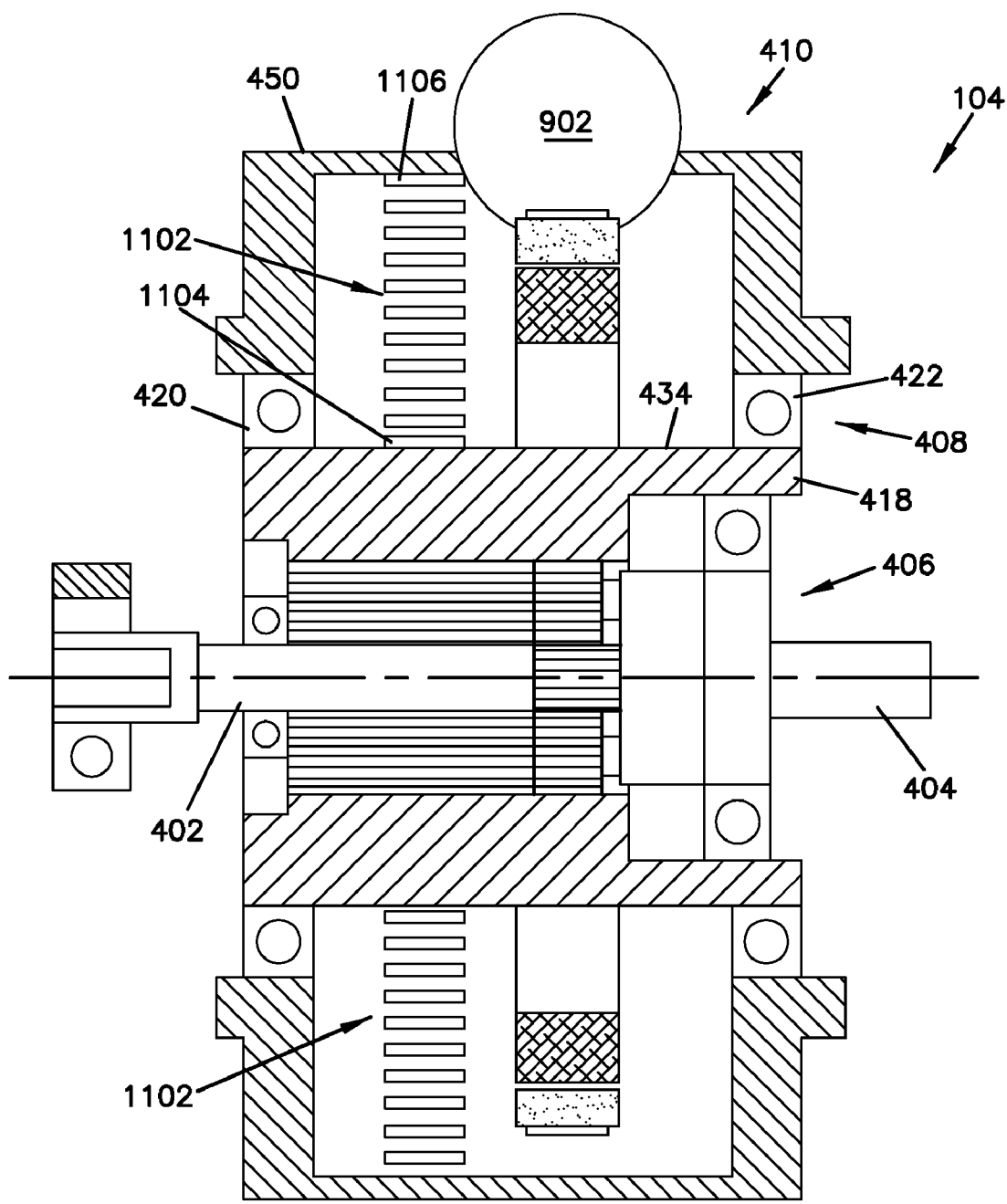
FIG. 11 is a schematic cross-sectional view of another example mechanical option module.

FIG. 11 is a cross-sectional view of a fourth embodiment of a mechanical option module 104. Mechanical option module 104 includes input shaft 402, output shaft 404, planetary gear module 406, bearing assembly 408 (including bearings 420 and 422), application-specific module 410, and housing 450. Planetary gear module 406 includes an outer ring 418 having an outer surface 434.

In this embodiment, application-specific module 410 includes an internal spring return. For example, in some situations it is desirable to automatically return a linear actuator to one end or the other of its permissible stroke upon the receipt of a signal or upon the loss or power. The internal spring return is operable in some embodiments to return the linear actuator to a predetermined position even in a situation where power has been lost. Other embodiments include other storage devices than a spring, such as a pneumatic cylinder, a hydraulic cylinder, or other energy storage devices.

In this embodiment, application-specific module 410 includes holding brake 902 and spring 1102. In some embodiments holding brake 902 is the same as described herein with reference to FIG. 9.

Spring 1102 is a device suitable for storing power and then selectively releasing the power to cause outer ring 418 to rotate. In the illustrated example, spring 1102 is a flat spiral spring (also known as a clock spring). The centermost end 1104 of the flat spiral spring 1102 is coupled to outer surface 434 of outer ring 418. The outermost end 1106 of the flat spiral spring 1102 is coupled to housing 450 (or another portion of application-specific module 410 that is itself coupled to housing 450). Other embodiments include other springs. For example, another possible embodiment includes a helical torsion spring (not shown in FIG. 11) arranged around outer ring 418 and sharing a common central axis. One end of the helical spring is coupled to housing 450, and the other end of the helical spring is coupled to outer ring 418 (such as to a side of protruding gear region 604). Other springs or energy storage devices are used in other embodiments.

During normal operation the holding brake 902 operates to inhibit rotation of outer ring 418. Spring 1102 is pre-wound to store energy therein. Normal operation of actuator 106 does not require energy to work against the spring 1102. Brake 902 holds the spring energy and actuator operation occurs with prime mover 102 supplying rotational torque to input shaft 402 and to actuator 106 via output shaft 404. Holding brake 902 can be selectively disengaged to release outer ring 418, such as upon the loss of power to holding brake 902 or upon receipt of a signal from a controller (e.g., 108, shown in FIG. 1). When holding brake 902 is released, the energy stored in spring 1102 is supplied to outer ring 418 to cause output shaft 404 to rotate (either clockwise or counterclockwise, depending on the orientation of spring 1102). The rotation of output shaft 404 is supplied to actuator 106 to move the output rod or shaft to a desired position.

In some embodiments the prime mover is capable of backdriving. As a result, some embodiments include an additional brake coupled to the prime mover or input shaft 402 to prevent backdriving when power is supplied from the spring 1102.

Figure 12:
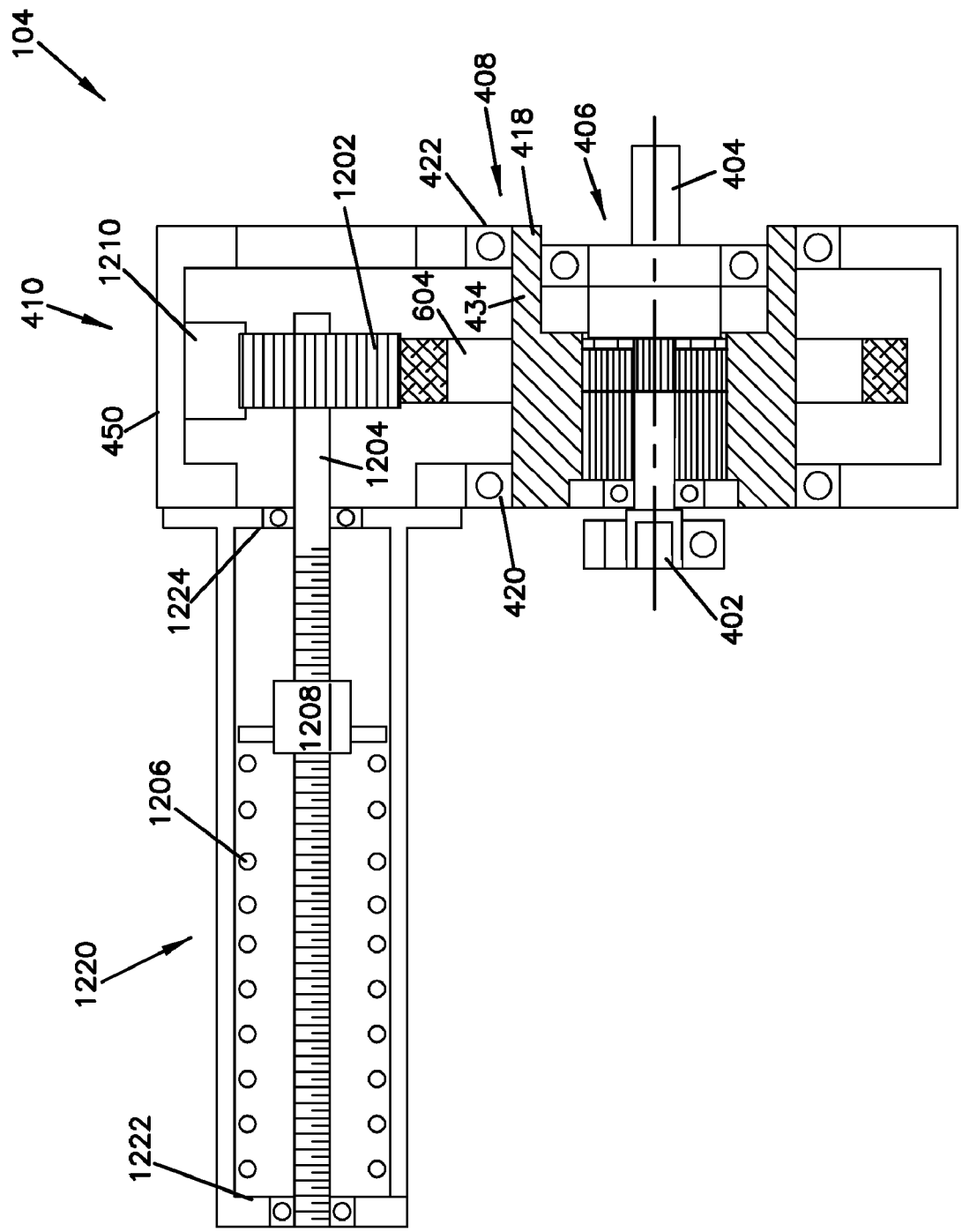
FIG. 12 is a schematic cross-sectional view of another example mechanical option module.

FIG. 12 is a schematic cross-sectional view of a fifth embodiment of a mechanical option module 104. Mechanical option module 104 includes input shaft 402, output shaft 404, planetary gear module 406, bearing assembly 408 (including bearings 420 and 422), application-specific module 410, and housing 450. Housing 450 includes a spring return region 1220 having a first end 1222 and a second end 1224. Planetary gear module 406 includes an outer ring 418 having an outer surface 434. Similar to the embodiment described with reference to FIG. 11, this alternate embodiment also provides an internal spring return capability. This embodiment is similar to that of FIG. 11, except that a linear spring is utilized to store the energy in place of a torsional spring.

In this embodiment, application-specific module 410 includes spur gear 1202, lead screw 1204, spring 1206, nut 1208, and brake 1210. Spur gear 1202 includes a plurality of radially extending teeth that intermesh with teeth of protruding gear region 604 of outer ring 418. Lead screw 1204 is coupled to spur gear 1202 and shares a common axis of rotation with spur gear 1202. Lead screw 1204 includes a helix angle suitable to allow the screw to backdrive. In some embodiments the helix angle is in a range from about 20 degrees to about 45 degrees or more. Other embodiments include other helix angles. Lead screw 1204 extends into spring return region 1220, through second end 1224, and to first end 1222. In some embodiments lead screw 1204 is supported relative to spring return region 1220 with one or more ball bearings.

Spring 1206 is contained within spring return region 1220. In this example, spring 1206 is a helical compression spring. Lead screw 1204 extends approximately along a central axis of spring 1206. One end of helix compression spring 1206 is connected to or presses against first end 1222 of spring return region 1220. The other end of spring 1206 is connected to or presses against nut 1208.

Nut 1208 is a threaded nut that rides on lead screw 1204 in the region between first and second ends 1222 and 1224 of spring return region 1220. Nut 1208 includes a threaded inner surface that causes nut 1208 to translate between first and second ends 1222 and 1224 as lead screw 1204 rotates. In some embodiments nut 1208 includes arms that ride within tracks (not shown) formed in sidewalls of spring return region 1220, which prevent nut 1208 from rotating with the rotation of lead screw 1204.

Brake 1210 is provided to selectively engage spur gear 1202, or alternatively, protruding gear region 604. When engaged, brake 1210 prevents rotation of the respective gear 1202 or gear region 604, which also prevents rotation of outer ring 418 of planetary gear module 406. In addition, brake 1210 is operable to prevent energy transfer between spring 1206 and planetary gear module 406 when it is engaged. When disengaged, brake 1210 allows rotation of gear 1202, gear region 604, and outer ring 418. Brake 1210 also allows energy transfer between spring 1206 and planetary gear module 406 when it is disengaged.

One possible method of operating a mechanical option module 104, such as the embodiment shown in FIG. 12 is as follows. It will be appreciated by those of skill in the art that while the example described herein refers to a linear actuator 106, that this embodiment could also be employed in an environment in which the rotary actuator 106 is present. The mechanical option module 104 is operated so that in the event that power is lost (or upon the occurrence of another event), the mechanical option module 104 will supply a rotational force at output shaft 404 sufficient to cause an attached output rod of a linear actuator 106 to advance to a desired position (typically, either the fully extended or fully retracted position). The mechanical option module can be operated to supply this force without electrical power present (e.g., in the absence of electrical power). At least some of the other mechanical option modules discussed herein can be similarly operated.

The mechanical option module is first operated so as to store energy in spring 1206. To do so, brake 1210 is disengaged and a rotational force is received from a prime mover (e.g., prime mover 102, shown in FIG. 1). The direction of rotation is selected so as to advance an output rod of the linear actuator (e.g., linear actuator 106), coupled to output shaft 404, to the position to which the output rod is intended to move upon loss of power (or occurrence of another event, such as receipt of a signal from controller 108, shown in FIG. 1).

Once the linear actuator has reached the desired position, movement of the output rod ceases (e.g., due to having reached a physical limit of the linear actuator or due to the engagement of a brake or other selective stopping mechanism). When this limit is reached, the prime mover continues supplying power to input shaft 402. The power is transferred through planetary gear module 406. Because output shaft 404 is now prevented from further rotation by the linear actuator, outer ring 418 begins to rotate. As outer ring 418 rotates, spur gear 1202 also rotates, thereby causing rotation of lead screw 1204. As the lead screw rotates, nut 1208 is forced in the direction of first end 1222 of spring return region 1220, compressing spring 1206. As spring 1206 is compressed, energy is stored within the spring 1206.

Once sufficient energy has been stored in spring 1206, brake 1210 is engaged and the prime mover stops. There are multiple methods of determining when sufficient energy has been stored in spring 1206. In some embodiments, controller 108 (shown in FIG. 1) is programmed to control the prime mover 102 (shown in FIG. 1) to compress spring 1206 a predetermined amount (such as by rotating input shaft 402 a predetermined number of times after the output rod of the linear actuator has reached the desired position). In another embodiment, a pressure switch or motor current setting is used to determine when sufficient energy has been stored. In yet another embodiment, a limit sensor or force sensor is provided on the outer ring 418 to determine when sufficient energy has been stored. The amount of energy stored is sufficient to advance the output rod of the linear actuator to the desired position (e.g., the fully extended position) even if the output rod is at a position (e.g., the fully retracted position) most distant from the desired position.

Once brake 1210 has been engaged, the linear actuator can be freely operated. Spring 1206 is prevented from releasing the energy stored therein by brake 1210, until the brake 1210 is disengaged, such as by a controller, upon power loss, or by an operator. Brake 1210 avoids requiring prime mover 102 to continually work to maintain spring 1206 in the compressed state during normal operation. Accordingly, in some embodiments energy consumed by the prime mover 102 is reduced by utilizing brake 1210 during normal operation. In some embodiments heat generated by prime mover 102 is also reduced. Brake 1210 can be normally open or normally closed depending on the desired operation. For example, a normally open brake 1210 can be used so that spring 1206 is released upon a loss of power to brake 1210.

If power is lost or upon the occurrence of another event, brake 1210 is released (either automatically or manually). When brake 1210 is released, spring 1206 supplies energy to nut 1208. A threaded inner surface of nut 1208 engages with the threaded lead screw 1204 causing lead screw 1204 to backdrive. The rotation of lead screw 1204 causes spur gear 1202 to rotate, and this force is transferred into outer ring 418. As outer ring 418 rotates, output shaft 404 is also caused to rotate so as to advance output rod of the coupled linear actuator to the desired position. In some embodiments the prime mover is capable of backdriving. As a result, some embodiments include an additional brake coupled to the prime mover or input shaft 402 to prevent backdriving when power is supplied from the spring 1206.

Other embodiments include other or additional energy storage devices than spring 1206. Examples of other energy storage devices include other forms of springs, pneumatic or hydraulic accumulators, and other energy storage devices. Multiple energy storage devices are used in some embodiments.

Figure 13:
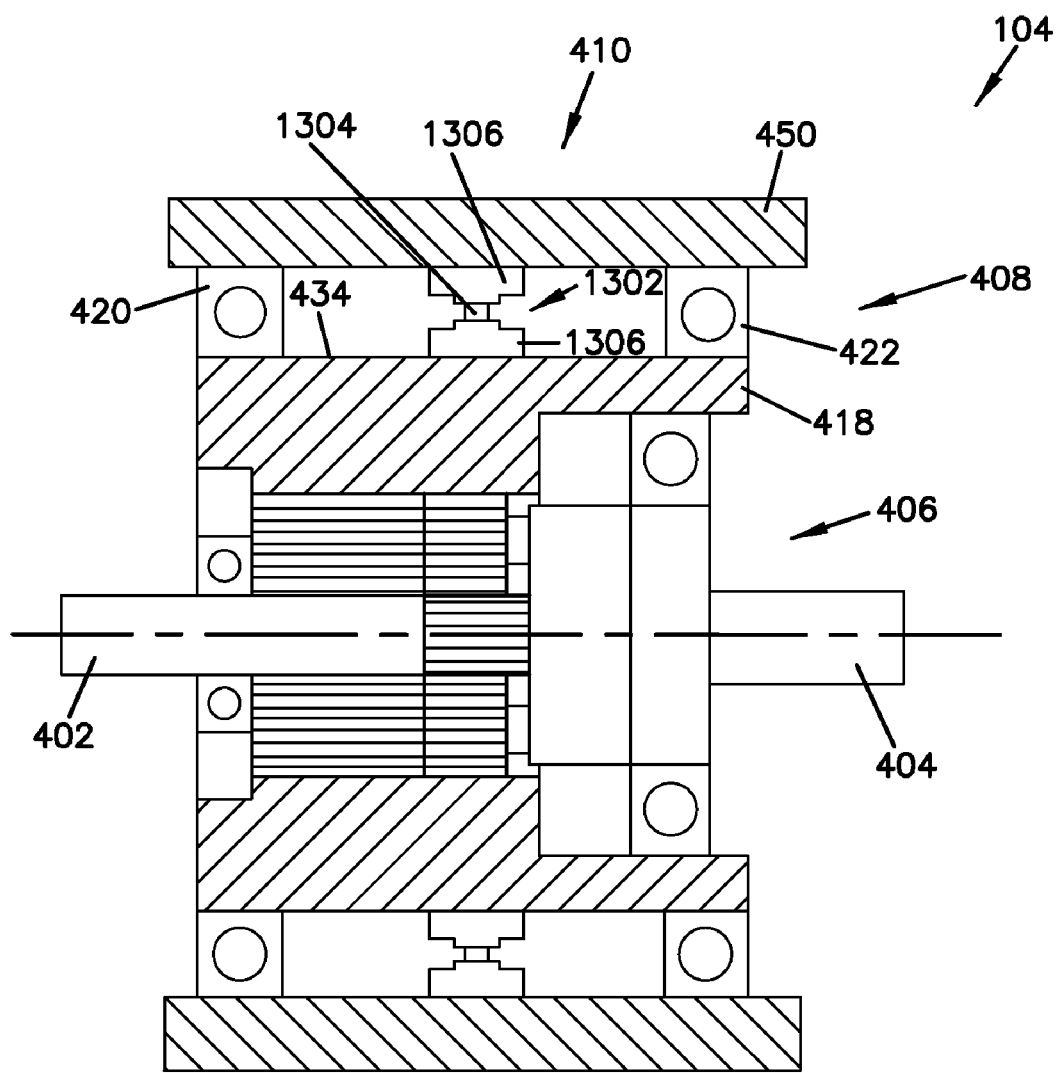
FIG. 13 is a schematic cross-sectional view of another example mechanical option module.
Figure 14:
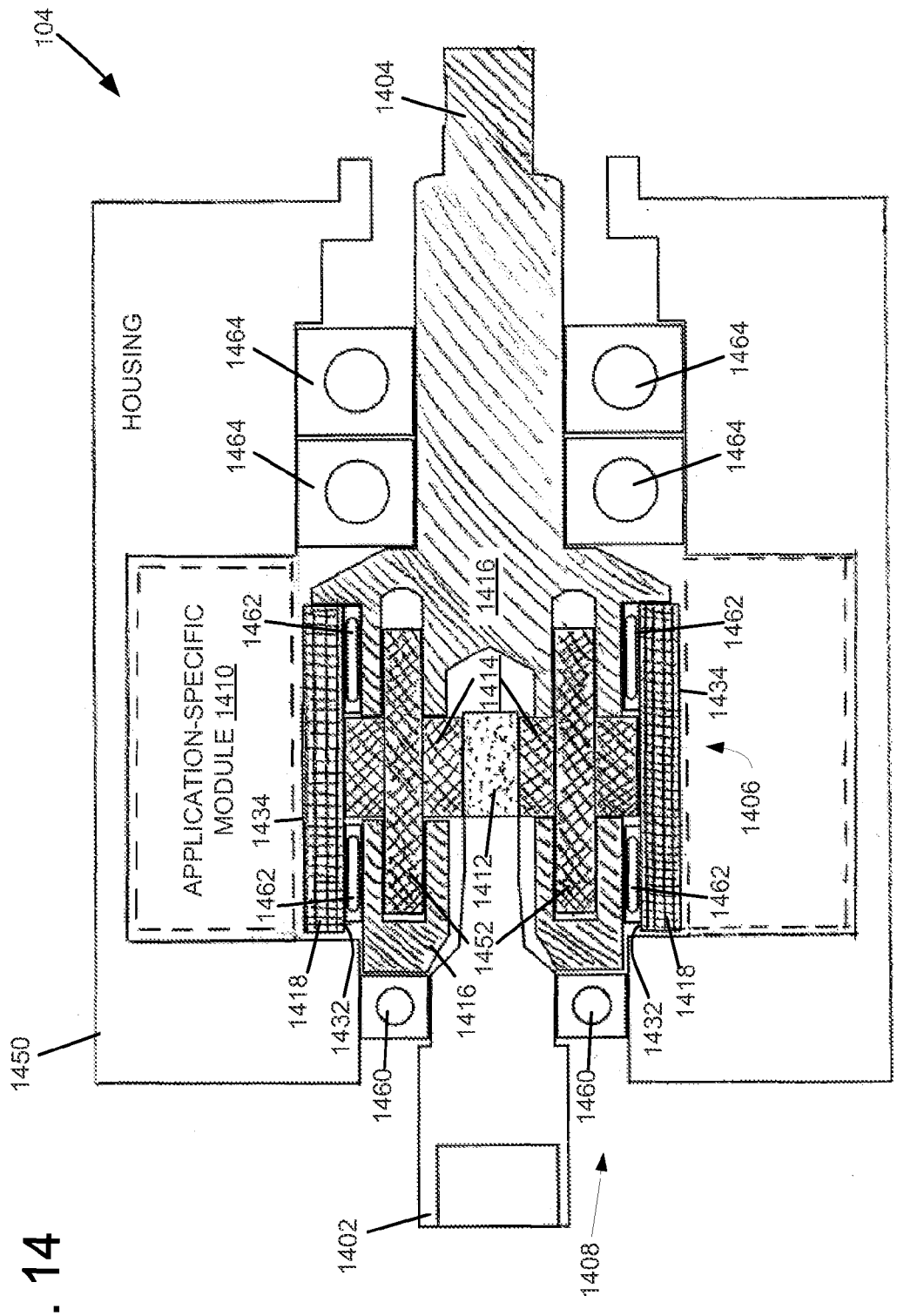
FIG. 14 is a schematic block diagram and cross-sectional view of another example mechanical option module.

FIG. 13 is a schematic cross-sectional view of a sixth embodiment of a mechanical option module 104. Mechanical option module 104 includes input shaft 402, output shaft 404, planetary gear module 406, bearing assembly 408, application-specific module 410, and housing 450. In this embodiment, application-specific module 410 includes one or more sensors to monitor the torque on mechanical option module 104 and/or an attached actuator 106.

In one example, mechanical option module 104 includes torque sensor 1302. Torque sensor 1302 is connected at one end to outer surface 434 of outer ring 418. The other end of torque sensor 1302 is connected to housing 450 (or another feature that is connected to housing 450). Torque sensor 1302 may be in the form of strain gauge elements 1304 bonded to a series of webs 1306 that connect the outer ring 418 to housing 450. Deflection of the webs and the resulting strain of the strain gauge elements will provide a measurement signal proportional to the output torque of output shaft 404 of the mechanical option module 104 or to the input torque to the rotary or linear actuator 106.

As power is transferred from input shaft 402 (from a prime mover) to output shaft 404 (and out to an actuator), the force or torque applied to the output shaft 404 is measured by torque sensor 1302. In some embodiments the torque can be measured very accurately, such as having an error of less than 1%. In some embodiments the outer ring 418 mounted on bearings 420 and 422 isolates the torque sensor 1302 from radial forces or bending loads that may be generated. As a result, the true torque applied to the rotary or linear actuator 106 can be precisely measured.

Some of the embodiments of the mechanical option module 104 described herein take advantage of the unique characteristics of a bearing-mounted planetary gear reducer. When a planetary gear reducer is configured such that the ring gear is fixed to the unit's case, the ring gear is non-rotatable. However if the ring gear is allowed to rotate in the same manner that the sun and planet gears rotate, then the rotational output of the mechanical option module 104 can be controlled by, for example, two rather than one input function. Specifically the output function is the sum of the two input functions factored by the respective reduction of each input. Thus by controlling the rotation of the ring gear, or alternating the sun gear input, the mechanical transfer function of this device can be readily modified.

Some embodiments of the actuation system described herein provide a series of different mechanical option models each exhibiting a unique mechanical transfer function needed to accomplish specific common applications. In some embodiments, the rotatable ring gear feature is used to accomplish the intended purpose.

The foregoing discussion illustrates some of the various possible embodiments. Further, in some embodiments, an actuator and subassembly are pre-engineered and can be readily connected to each other to quickly meet the needs of a particular application by selecting and matching the correct predesigned and possibly pre-manufactured subassemblies. In another possible embodiment, the actuator and subassembly are manufactured as a single machine and not configured to be connected with other actuators or subassemblies.

In some embodiments several mechanical option modules are pre-designed and possibly pre-manufactured, each being configured to perform a different function with an actuators housing when matched with the actuator, thus allowing unique and specific control of the actuator's output.

A block diagram illustrating a second exemplary configuration of a mechanical option module 104 will now be described with reference to FIG. 14. Several more detailed examples of the mechanical option module 104 shown in FIG. 14 are then illustrated and described with reference to FIGS. 15-16.

FIG. 14 is a schematic block diagram and cross-sectional view of another example mechanical option module 104. In some embodiments, mechanical option module 104 includes input shaft 1402, output shaft 1404, planetary gear module 1406, bearing assembly 1408, application-specific module 1410, and housing 1450. Some components of this example of mechanical option modules 104 are the same or similar to the commonly named components discussed in more detail herein. Accordingly, those components will not be discussed again in detail below. For example, input shaft 1402, output shaft 1404, planetary gear module 1406, application-specific module 1410, and housing 1450, are all similar to input shaft 402, output shaft 404, planetary gear module 1406, application-specific module 410, and housing 450 introduced and discussed in more detail herein with reference to FIGS. 4 and 5.

Input shaft 1402 receives power, such as from prime mover 102. The power is transferred through input shaft 1402 to sun gear 1412 configured at an end of input shaft 1402. The power delivered to input shaft 1402 causes input shaft 1402 and sun gear 1412 to rotate about a longitudinal axis. Sun gear 1412 includes teeth that extend therefrom, which are configured to engage with teeth of planetary gears 1414.

A plurality of planet gears are arranged around sun gear 1412, which also include teeth to engage with the teeth of sun gear 1412. In this example, planetary gear module 1406 includes three planet gears 1414, but other embodiments include different quantities of planet gears 1414. Planet gears 1414 are rotatably connected to planet carrier 1416. In this example, planet carrier 1416 is located on both sides of planet gears 1414 (as shown in FIG. 14). In some embodiments planet gears 1414 include axles 1452 that are aligned with the axis of rotation of planet gears 1414. When sun gear 1412 rotates, the rotation is transferred to planet gears 1414, which rotate about their axes of rotation. In some embodiments axle 1452 also rotate relative to planet carrier 1416, while in other embodiments planet gears 1414 rotate around axle 1452.

Planetary gear module 1406 also includes outer ring 1418. In some embodiments, outer ring 1418 includes an inner surface 1432 and an outer surface 1434. Inner surface 1432 is typically a cylindrical bore and includes a plurality of teeth configured to engage with teeth of planet gears 1414. In some embodiments outer surface 1434 includes a smooth outer surface, while in other embodiments, outer surface 1434 includes a plurality of teeth. In some embodiments the shape and configuration of outer surface 1434 is determined by the application-specific module. For example, in some embodiments illustrated herein the application-specific module requires another gear coupled to outer ring 1418 which extends from or integral with outer surface 1434.

Bearing assembly 1408 is provided to separate certain moving components from each other. In this example, bearing assembly 1408 includes bearing 1460, bearings 1462, and bearings 1464. Multiple bearings can be substituted for a single bearing and a single bearing can be substituted for multiple bearings in various possible embodiments. In addition, in some embodiments one or more of the bearing are not included (or replaced with an air or liquid gap), such as when the associated components are adequately supported by other parts of the mechanical option module or are externally supported (e.g., input and output shafts).

In this example, bearings 1460 are arranged at an interface between housing 1450 and input shaft 1402. Bearing 1460 is, for example, a ball bearing, that permits input shaft 1402 to rotate independent of housing 1450 and supports input shaft 1402. Bearings 1462 are arranged at an interface between planet carrier 1416 and outer ring 1418. Bearing 1460 is, for example, a needle bearing, that permits planet carrier 1416 to rotate independent of outer ring 1434. Bearings 1464 are arranged at an interface between output shaft 1404 and housing 1450. Bearings 1464 are, for example, ball bearings, that permit output shaft 1404 to rotate independent of housing 1450 and supports output shaft 1404.

In this example, there is no mechanical coupling between the housing 1450 and internal components of the mechanical option module (e.g., input shaft 1402, output shaft 1404, and planetary gear module 1406), except as provided by the application-specific module.

When a torque is provided to input shaft 1402, the torque is transferred to sun gear 1412, and then to planet gears 1414. Planet gears 1414 then transfer the torque to outer ring 1418. If outer ring 1418 is fixed by the application-specific module 1410 with respect to the housing 1450, all of the torque supplied by planet gears 1414 to outer ring 1418 is transferred into planet carrier 1416 that supports the planet gears 1414. The torque on the planet carrier 1416 is then transferred to output shaft 1404, which is coupled to planet carrier 1416.

As discussed in detail herein, additional functions are provided by allowing outer ring 1418 freedom to move with respect to the housing. It is recognized that the examples previously described herein (e.g., FIGS. 6-12) with reference to the mechanical option module shown in FIG. 4 form yet other embodiments when combined with the example mechanical option module shown in FIG. 14. Several specific examples will now be described to illustrate this in more detail.

Figure 15:
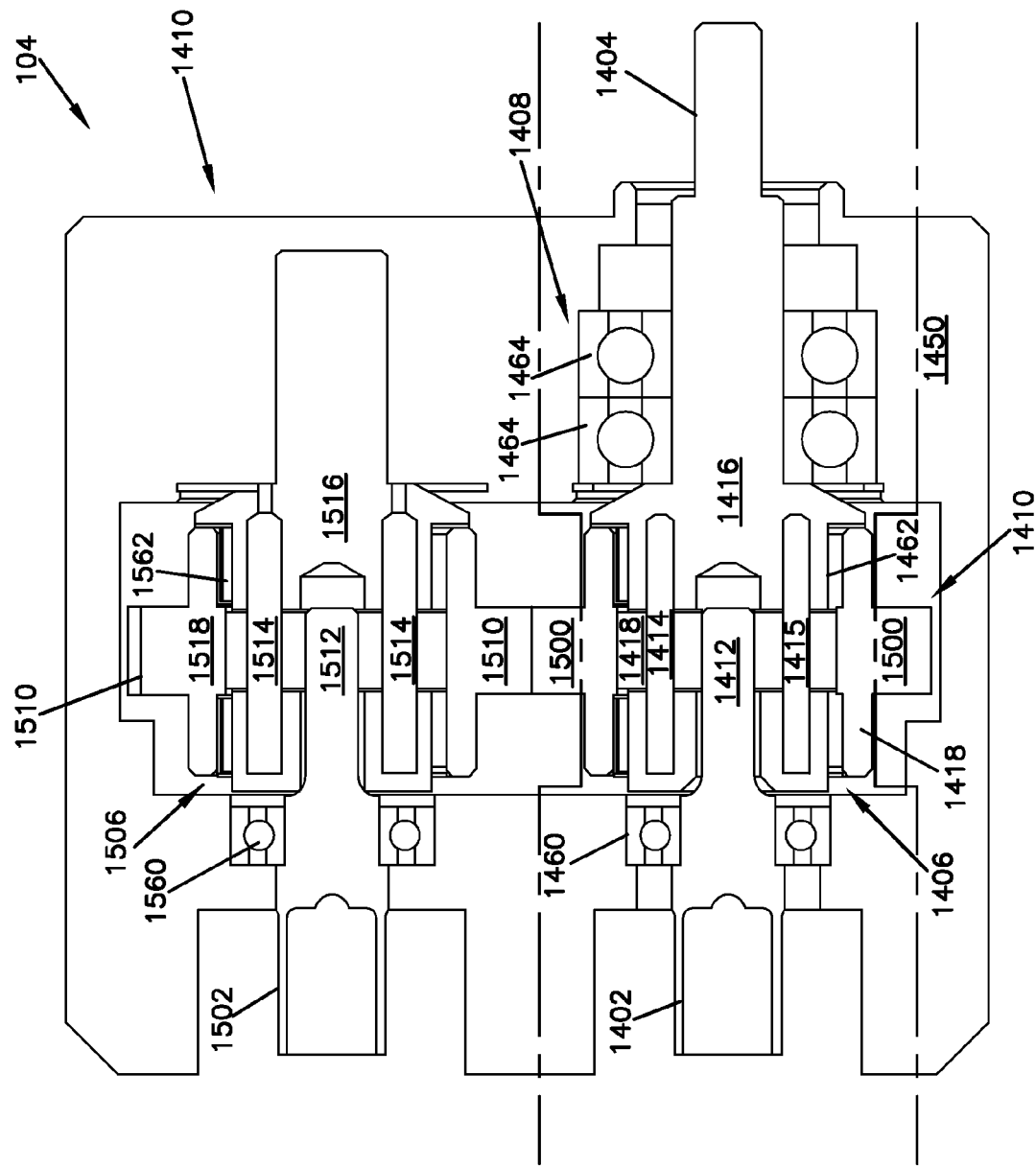
FIG. 15 is a schematic cross-sectional view of another example mechanical option module.

FIG. 15 is a schematic cross-sectional view of another example mechanical option module 104. The example illustrated in FIG. 15 is similar in many respects to the example illustrated and described herein with reference to FIG. 8. More specifically, both embodiments include an application-specific module 410/1410 that permits the mechanical option module 104 to interface with a second drive unit, such as a secondary motor. The example shown in FIG. 15, however, includes the mechanical option module arrangement of FIG. 14, rather than that of FIG. 4. Various other differences are also included, as discussed below.

In this example, mechanical option module 104 includes input shaft 1402, output shaft 1404, planetary gear module 1406, bearing assembly 1408, application-specific module 1410, and housing 1450. As previously discussed, planetary gear module 1406 includes sun gear 1412, planet gears 1414, planet carrier 1416, and outer ring 1418, and bearing assembly 1408 includes bearings 1460, 1462, and 1464.

In this example, application-specific module 1410 includes protruding gear section 1500, secondary input shaft 1502, planetary gear module 1506 (including sun gear 1512, planet gears 1514, planet carrier 1516, and outer ring 1518), bearing assembly 1508 (including bearings 1560, 1562), and protruding gear section 1510.

In some embodiments, application-specific module 1410 is configured to be coupled to a secondary drive unit (e.g., a motor) through input shaft 1502. When in operation, the secondary drive unit provides a torque to input shaft 1502 causing it to rotate. Some embodiments include a secondary drive unit with a brake that prevents (or reduces) rotation of input shaft 1502 when the secondary drive unit is not in operation. Alternatively, in some embodiments a separate brake mechanism is provided, such as to engage protruding gear section 1510.

During operation of the secondary drive unit, a torque is supplied by the drive unit to input shaft 1502. The torque is transferred to sun gear 1512, into planet gears 1514, and into outer ring 1518 and protruding gear section 1510. In some embodiments planet carrier 1516 is rigidly connected to housing 1450 to prevent rotation of planet carrier 1516. Protruding gear section 1510 is engaged with protruding gear section 1500, and therefore transfers the torque into protruding gear section 1500. Upon rotation of protruding gear section 1500, outer ring 1418 (from which protruding gear section 1500 extends) is also caused to rotate. The rotation is then transferred through planet gears 1414 and planet carrier 1416, such as to increase the speed of rotation of the output shaft 1404.

In some embodiments the two drive units are substantially similar. In another embodiment, the two drive units are different, such as one being a high torque and low speed drive unit, and the other being a low torque and high speed drive unit. In another possible embodiment, input shaft 1502 is a manual input shaft configured to receive a manual input, such as from a wrench, hand tool, or hand power tool (e.g., a drill).

In some embodiments, the mechanical option module 104 illustrated in FIG. 14 is operated as a redundant system, where the secondary drive unit is provided in case of failure of the first drive unit. For example, when the controller 108 (shown in FIG. 1) detects a failure of the prime mover 102, controller 108 activates the secondary drive unit.

The example shown in FIG. 15 allows for two separate inputs into the mechanical option module, including an input on input shafts 1402 and 1502. In yet another possible embodiment, a third input is provided. To provide an additional input, for example, an input shaft is provided through housing 1450 and connects to planet carrier 1516 (in a similar manner as output shaft 1404 and planet carrier 1416 directly below). In this example, the planet carrier 1516 is not rigidly connected to housing 1450, and can include bearings (similar to bearings 1464) separating the input shaft from the housing. The third input can be used for a variety of reasons, such as redundancy or to adjust the speed of the output shaft 1404.

Figure 16:
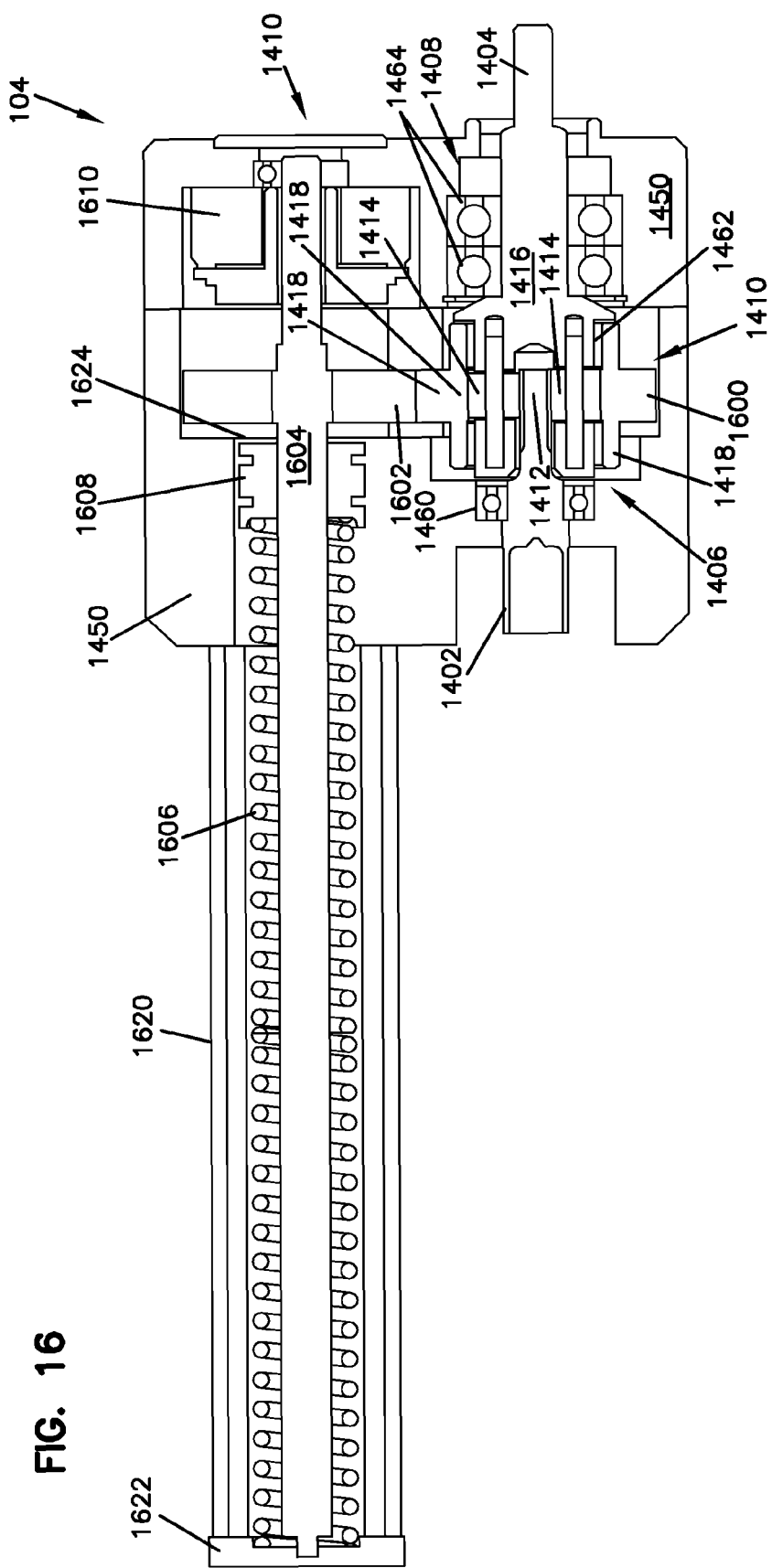
FIG. 16 is a schematic cross-sectional view of another example mechanical option module.

FIG. 16 is a schematic cross-sectional view of another example mechanical option module 104. The example illustrated in FIG. 16 is similar in many respects to the example illustrated and described herein with reference to FIG. 12. More specifically, both embodiments include an application-specific module 410/1410 that permits the mechanical option module 104 to store and selectively deliver energy. The example shown in FIG. 16, however, includes the mechanical option module arrangement of FIG. 14, rather than that of FIG. 4. Various other differences are also included, as discussed below.

In this example, mechanical option module 104 includes input shaft 1402, output shaft 1404, planetary gear module 1406, bearing assembly 1408, application-specific module 1410, and housing 1450. As previously discussed, planetary gear module 1406 includes sun gear 1412, planet gears 1414, planet carrier 1416, and outer ring 1418, and bearing assembly 1408 includes bearings 1460, 1462, and 1464.

In this example, application-specific module 1410 includes protruding gear region 1600, gear 1602, lead screw 1604, spring 1606, nut 1608, and brake 1610. Gear 1602 includes teeth that engage with teeth of protruding gear region 1600. Gear 1602 is connected to lead screw 1604, such that when gear 1602 rotates the lead screw 1604 also rotates. In some embodiments lead screw 1604 includes a helix angle suitable to allow the screw to backdrive. Lead screw 1604 extends into spring return region 1620, through second end 1624, and to first end 1622.

Spring 1606 is contained within spring return region 1620. In this example, spring 1606 is a helical compression spring. Lead screw 1604 extends approximately along a central axis of spring 1606. One end of spring 1606 is connected to or presses against first end 1622 of spring return region 1620. The other end of spring 1606 is connected to or presses against nut 1608.

Nut 1608 is a threaded nut that rides on screw 1604 in the region between first and second ends 1622 and 1624 of spring return region 1620. Nut 1608 includes a threaded inner surface that causes nut 1608 to translate between first and second ends 1622 and 1624 as lead screw 1604 rotates. In some embodiments, nut 1608 includes an anti-rotation mechanism, such as protruding arms that ride within tracks (not shown) formed in sidewalls of spring return region 1620. In some embodiments, the arms are keyed features that ride in a keyway. In another embodiment, the shape of nut 1608 (e.g. squared, etc.) matches the internal shape of spring return region 1620.

Brake 1610 is provided to selectively engage lead screw 1604 in this embodiment. In other possible embodiments, brake 1610 operates to selectively engage with one or more of: gear 1602, protruding gear region 1600, outer ring 1418, or similar components to prevent rotation of lead screw 1604 when engaged.

Brake 1610 is selectively disengaged to allow rotation of lead screw 1604. After energy has been stored in the compressed spring 1606, disengagement of brake 1610 causes energy to be transferred from spring 1606 into nut 1608, which causes rotation of lead screw 1604. The resulting torque is then transferred into gear 1602 and into the protruding gear region 1600, causing rotation of outer ring 1418.

Several example applications of the mechanical option module shown in FIG. 16 are the same or similar to those discussed herein with reference to FIG. 12.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An apparatus comprising:
   a housing;
   an input shaft arranged and configured to receive a rotary input;
   an output shaft;
   a planetary gear module including a sun gear coupled to the input shaft, a planet carrier coupled to the output shaft, an outer ring, and planet gears meshed with the sun gear and the outer ring, wherein the outer ring is moveable relative to the housing; and
   an application-specific module coupled to the housing and arranged and configured to influence movement of the outer ring relative to the housing, the application-specific module further comprising a brake to selectively permit rotation of the outer ring of the planetary gear module and to selectively inhibit rotation of the outer ring of the planetary gear module, and further comprising an energy storage device, wherein the application-specific module is arranged and configured to deliver energy from the energy storage device while the brake selectively permits rotation of the outer ring.

2. The apparatus of claim 1, wherein the application-specific module is arranged and configured to selectively influence movement of the outer ring relative to the housing.

3. The apparatus of claim 2, wherein the application-specific module further comprises a secondary input shaft coupled to the outer ring such that the outer ring rotates upon rotation of the secondary input shaft.

4. The apparatus of claim 3, wherein the secondary input shaft is a manual input shaft arranged and configured to receive a manual rotary input.

5. The apparatus of claim 3, wherein the secondary input shaft is connected to a secondary drive unit.

6. The apparatus of claim 5, wherein the secondary drive unit is arranged and configured to provide a secondary rotary input to the secondary input shaft upon failure of a prime mover to provide the rotary input.

7. The apparatus of claim 5, wherein the secondary drive unit is arranged and configured to provide a secondary rotary input at the same time as a prime mover provides the rotary input.

8. The apparatus of claim 1, further comprising a bearing assembly connected to the housing and supporting the planetary gear module, while permitting rotation of the outer ring relative to the housing.

9. The apparatus of claim 1, further comprising an actuator having an actuator input shaft.

10. The apparatus of claim 9, wherein the actuator is a screw type actuator.

11. The apparatus of claim 10, wherein the actuator is a linear actuator further comprising:
transmission rollers coupled to the actuator input shaft; and
an output rod coupled to the transmission rollers, wherein the transmission rollers are arranged and configured to translate the output rod along a linear axis upon rotation of the actuator input shaft.

12. The apparatus of claim 9, wherein the actuator is a rotary actuator.

13. An actuation system comprising:
a prime mover having a drive shaft;
a mechanical option module including:
a housing;
an input shaft coupled to the drive shaft;
an output shaft;
a planetary gear module including a sun gear coupled to the input shaft, a planet carrier coupled to the output shaft, an outer ring, and planet gears meshed with the sun gear and the outer ring; and
an application-specific module connected to the housing and configured to selectively influence rotation of the outer ring of the planetary gear module, the application-specific module comprising a brake to selectively permit rotation of the outer ring of the planetary gear module and to selectively inhibit rotation of the outer ring of the planetary gear module, and further comprising an energy storage device, wherein the application-specific module is arranged and configured to deliver energy from the energy storage device while the brake selectively permits rotation of the outer ring;
an actuator having an actuator input shaft, the actuator input shaft coupled to the output shaft of the mechanical option module; and
a controller that controls at least one of the prime mover, the mechanical option module, and the actuator.

14. The actuation system of claim 13, wherein the controller controls the application-specific module to selectively influence rotation of the outer ring.

15. A method of generating an output:
rotating a sun gear of a planetary gear module upon receipt of a rotary input, the planetary gear module including planet gears, a planet carrier, and an outer ring;
selectively influencing rotation of the outer ring of the planetary gear module relative to a housing to adjust rotation of an output shaft including:
storing energy in an energy storage device; and
delivering the energy to the outer ring of the planetary gear module upon an occurrence of an event to cause rotation of the output shaft; and
actuating a linear actuator with the output shaft.

16. The method of claim 15, wherein the event is a loss of electrical power to a prime mover providing the rotary input.

17. The method of claim 16, wherein delivering the energy to the outer ring causes an output rod of the linear actuator to translate to a predetermined position.

18. The method of claim 15, wherein selectively influencing rotation of the outer ring further comprises:
inhibiting rotation of the outer ring; and
releasing the outer ring to permit the outer ring to rotate upon the occurrence of an event.

19. The method of claim 15, wherein selectively influencing rotation of the outer ring comprises:
receiving a manual rotary input; and
rotating the outer ring with the manual rotary input.

20. The method of claim 15, wherein selectively influencing rotation of the outer ring comprises:
receiving a second rotary input; and
rotating the outer ring using the rotary input.

21. The method of claim 20, wherein rotating the outer ring using the rotary input causes a speed of the output shaft to increase.

22. The method of claim 20, wherein the second rotary input is a redundant input that is provided when the rotary input is no longer provided to the sun gear.

23. An apparatus comprising:
a housing;
an input shaft arranged and configured to receive a rotary input;
an output shaft;
a planetary gear module including a sun gear coupled to the input shaft, a planet carrier coupled to the output shaft, an outer ring, and planet gears meshed with the sun gear and the outer ring, wherein the outer ring is moveable relative to the housing;
an application-specific module coupled to the housing and arranged and configured to influence movement of the outer ring relative to the housing; and
a screw-type linear actuator having an actuator input shaft coupled to the output shaft, the actuator further comprising:
transmission rollers coupled to the actuator input shaft; and
an output rod coupled to the transmission rollers, wherein the transmission rollers are arranged and configured to translate the output rod along a linear axis upon rotation of the actuator input shaft.

24. The apparatus of claim 23, wherein the application-specific module is arranged and configured to selectively influence movement of the outer ring relative to the housing.

25. The apparatus of claim 24, wherein the application-specific module further comprises a secondary input shaft coupled to the outer ring such that the outer ring rotates upon rotation of the secondary input shaft.

26. The apparatus of claim 25, wherein the secondary input shaft is a manual input shaft arranged and configured to receive a manual rotary input.

27. The apparatus of claim 25, wherein the secondary input shaft is connected to a secondary drive unit.

28. The apparatus of claim 27, wherein the secondary drive unit is arranged and configured to provide a secondary rotary input to the secondary input shaft upon failure of a prime mover to provide the rotary input.

29. The apparatus of claim 27, wherein the secondary drive unit is arranged and configured to provide a secondary rotary input at the same time as a prime mover provides the rotary input.

30. The apparatus of claim 23, further comprising a bearing assembly connected to the housing and supporting the planetary gear module, while permitting rotation of the outer ring relative to the housing.

31. The apparatus of claim 23, wherein the application-specific module further comprises a brake to selectively permit rotation of the outer ring of the planetary gear module and to selectively inhibit rotation of the outer ring of the planetary gear module.

32. The apparatus of claim 23, wherein the actuator is a rotary actuator.

33. The apparatus of claim 23, wherein the application-specific module comprises a sensor coupled to the outer ring and to the housing to detect a torque on the outer ring.

34. An actuation system comprising:
a prime mover having a drive shaft;
a mechanical option module including:
    a housing;
    an input shaft coupled to the drive shaft;
    an output shaft;
    a planetary gear module including a sun gear coupled to the input shaft, a planet carrier coupled to the output shaft, an outer ring, and planet gears meshed with the sun gear and the outer ring; and
    an application-specific module connected to the housing and configured to selectively influence rotation of the outer ring of the planetary gear module;
a screw-type linear actuator having an actuator input shaft, the actuator input shaft coupled to the output shaft of the mechanical option module and further comprising:
    transmission rollers coupled to the actuator input shaft; and
    an output rod coupled to the transmission rollers, wherein the transmission rollers are arranged and configured to translate the output rod along a linear axis upon rotation of the actuator input shaft; and
a controller that controls at least one of the prime mover, the mechanical option module, and the actuator.

35. The actuation system of claim 34, wherein the controller controls the application-specific module to selectively influence rotation of the outer ring.

36. A method of generating an output:
rotating a sun gear of a planetary gear module upon receipt of a rotary input, the planetary gear module including planet gears, a planet carrier, and an outer ring;
selectively influencing rotation of the outer ring of the planetary gear module relative to a housing to adjust rotation of an output shaft, including:
    receiving a manual rotary input; and
    rotating the outer ring with the manual rotary input; and
actuating a linear actuator with the output shaft.

37. The method of claim 36, wherein selectively influencing rotation of the outer ring further comprises:
inhibiting rotation of the outer ring; and
releasing the outer ring to permit the outer ring to rotate upon the occurrence of an event.

38. A method of generating an output:
rotating a sun gear of a planetary gear module upon receipt of a rotary input, the planetary gear module including planet gears, a planet carrier, and an outer ring;
selectively influencing rotation of the outer ring of the planetary gear module relative to a housing to adjust rotation of an output shaft, including:
    receiving a second rotary input; and
    rotating the outer ring using the second rotary input, wherein the rotating of the outer ring using the second rotary input causes a speed of an output shaft to increase; and
actuating a linear actuator with the output shaft.

39. A method of generating an output:
rotating a sun gear of a planetary gear module upon receipt of a rotary input, the planetary gear module including planet gears, a planet carrier, and an outer ring;
selectively influencing rotation of the outer ring of the planetary gear module relative to a housing to adjust rotation of an output shaft, including:
    receiving a second rotary input;
    rotating the outer ring using the second rotary input, wherein the second rotary input is a redundant input that is provided when the rotary input is no longer provided to the sun gear; and
actuating a linear actuator with the output shaft.

* * * * *

UNITED STATES PATENT AND TRADEMARK OFFICE
CERTIFICATE OF CORRECTION

PATENT NO. : 8,277,349 B2  
APPLICATION NO. : 12/712967  
DATED : October 2, 2012  
INVENTOR(S) : Erhart et al.

Page 1 of 1

It is certified that error appears in the above-identified patent and that said Letters Patent is hereby corrected as shown below:

Front page, (56) References Cited, Other Publications: "Report and Witten Opinion" should read --Report and Written Opinion--

Signed and Sealed this  
Second Day of April, 2013

Teresa Stanek Rea  
*Acting Director of the United States Patent and Trademark Office*